United States Patent
Lindner

(10) Patent No.: US 11,924,575 B1
(45) Date of Patent: Mar. 5, 2024

(54) CONVERSION OF COLOR FILM TO DIGITAL MEDIA

(71) Applicant: Media Matters LLC, Miami, FL (US)

(72) Inventor: James Alan Lindner, Miami, FL (US)

(*) Notice: Subject to any disclaimer, the term of this patent is extended or adjusted under 35 U.S.C. 154(b) by 0 days.

(21) Appl. No.: 18/332,699

(22) Filed: Jun. 9, 2023

Related U.S. Application Data

(60) Provisional application No. 63/493,018, filed on Mar. 30, 2023.

(51) Int. Cl.
| | | |
|---|---|---|
| H04N 5/253 | (2006.01) | |
| G01N 21/31 | (2006.01) | |
| H04N 5/91 | (2006.01) | |
| H04N 23/10 | (2023.01) | |
| H04N 23/71 | (2023.01) | |
| H04N 23/74 | (2023.01) | |

(52) U.S. Cl.
CPC ............ H04N 5/253 (2013.01); G01N 21/31 (2013.01); H04N 5/91 (2013.01); H04N 23/10 (2023.01); H04N 23/71 (2023.01); H04N 23/74 (2023.01)

(58) Field of Classification Search
CPC .............................. H04N 5/253; H04N 23/10
See application file for complete search history.

(56) References Cited

U.S. PATENT DOCUMENTS

| | | | | |
|---|---|---|---|---|
| 5,406,070 A * | 4/1995 | Edgar | ................ | H04N 23/71 |
| | | | | 348/E5.049 |
| 6,178,016 B1 * | 1/2001 | Ashe | ................ | H04N 1/121 |
| | | | | 358/487 |
| 6,611,293 B2 * | 8/2003 | Tarnoff | ................ | G11B 27/034 |
| | | | | 348/E7.015 |
| 6,724,420 B2 * | 4/2004 | Spence | ................ | G11B 27/034 |
| | | | | 348/E3.003 |
| 2001/0026369 A1 * | 10/2001 | Yamaguchi | ........... | G01N 21/255 |
| | | | | 358/1.1 |
| 2002/0051215 A1 * | 5/2002 | Thering | ............ | H04N 1/00262 |
| | | | | 358/302 |

(Continued)

OTHER PUBLICATIONS

Shrestha, et al., LED Based Multispectral Film Scanner for Accurate Color Imaging, Nov. 2012, 2012 Eighth International Conference on Signal Image Technology and Internet Based Systems, p. 812. (Year: 2012).*

(Continued)

*Primary Examiner* — Jayanti K Patel
*Assistant Examiner* — Christopher Kingsbury Glover

(57) ABSTRACT

The applicant proposes a method and an apparatus to realize a faster, easier and more precise multispectral digitalization of films. The proposed method and apparatus ensure quality control of the multispectral film digitization using sensors and can correct the digital images for film shrinkage and deformation. This can allow for efficient digitization of films which can enable an effective automatization of the mass safeguarding of archived films. The proposed film digitizer apparatus can comprise a novel and improved light source module, which comprise a light assembly that can allow for better illumination of the film and shorter required exposure time that can lead to lower acquisition time for each of the various wavelength image acquisitions for each film image. Monitoring of the spectral distribution and/or the temperature of the light sources can ensure quality control of the digitalization.

20 Claims, 21 Drawing Sheets

(56) References Cited

U.S. PATENT DOCUMENTS

| | | | | |
|---|---|---|---|---|
| 2003/0142208 A1* | 7/2003 | Nakamura | ............ | H04N 1/195 382/319 |
| 2004/0120162 A1* | 6/2004 | Tsimerman | .......... | A61C 19/004 362/572 |
| 2022/0196471 A1* | 6/2022 | Gerwe | ................... | H04N 23/11 |

OTHER PUBLICATIONS

Giorgio Trumpy, et al., A multispectral design for a new generation of film scanners. Proceedings vol. 11784, Optics for Arts, Architecture, and Archaeology VIII; 117840Z (2021). https://doi.org/10.1117/12.2592655. Event: SPIE Optical Metrology, 2021.

Flückiger et al., Film Material-Scanner Interaction. Posted at the Zurich Open Repository and Archive, University of Zurich, ZORA URL: https://doi.org/10.5167/uzh-151114, Published Research Report. Feb. 18, 2018.

Giorgio Trumpy et al., Light Source Criteria for Digitizing Color Films. 2015 Colour and Visual Computing Symposium (CVCS). Date of Conference: Aug. 25-26, 2015; Date Added to IEEE Xplore: Sep. 28, 2015. DOI: 10.1109/CVCS.2015.7274894.

Leonardo Noriega et al., Colour Characterisation of a Digital Cine Film Scanner. IS&T/SID Ninth Color Imaging Conference. Jan. 2001.

Raju Shrestha, et al., Multispectral imaging using LED illumination and an RGB Camera. Jan. 2013Color and Imaging Conference 21(1). DOI:10.2352/CIC.2013.21.1.art00003.

Raju Shrestha et al., An experimental study of fast multispectral imaging using LED illumination and an RGB camera. Conference • Oct. 2015. DOI: 10.2352/CIC.2015.23.1.art00008.

Trumpy, et al., Cyber-digitization: pushing the borders of film restoration's ethic. Posted at the Zurich Open Repository and Archive, University of Zurich. ZORA URL: https://doi.org/10.5167/uzh-158944. Conference or Workshop Item. Electronic Media & Visual Arts, Nov. 2018.

Raju Shrestha et al., LED based multispectral film scanner for accurate color imaging. 2012 Eighth International Conference on Signal Image Technology and Internet Based Systems. Nov. 2012. DOI: 10.1109/SITIS.2012.122. pp. 811-817.

Presentation: Jim Lindner, FILMIC Virtualization Model for Digital Motion Picture Film Preservation Harvesting more that is FILMIC in Digital Film Preservation. 2018.

Presentation: Jim Lindner, FILMIC Virtualization Model for Digital Motion Picture Film Preservation. Harvesting more that is FILMIC in Digital Film Preservation. Public presentation was on Mar. 9, 2016 in Singapore at the JTS (Joint Technical Symposium). The relevant slides are 17-30.

Presentation: Jim Lindner, FILMIC Virtualization Model for Digital Motion Picture Film Preservation. Harvesting more that is FILMIC in Digital Film Preservation. Presentation given on Jun. 29, 2016 at the National Audio and Visual Conservation Center in Culpeper VA (The Library of Congress). The relevant slides are 14-42.

Presentation: Jim Lindner, FILMIC Virtualization Model for Digital Motion Picture Film Preservation. Harvesting more that is FILMIC in Digital Film Preservation. Presentation on Nov. 9, 2016 was a public presentation given at the conference of the Association for Moving Image Archivists in Pittsburg at a seminar entitled "the Real thing". The slides that are relevant are #15-31.

ERC Proof of Concept VeCoScan. Posted by ERC Advanced Grant FilmColors. May 11, 2020. Retrieved from website: https://vimeo.com/417111087.

VeCoScan. Unveiling a New Generation of Archival Film Scanners. 5th International Conference Colour in Film. Mar. 12, 2020. Retrieved from website: https://5thinternationalconferencec2020.sched.com/event/YMJw.

VeCoScan. A New Versatile, Multi-spectral Archival Film Scanner. Posted on Jan. 30, 2020. Retrieved from website: http://colour-in-film.net/vecoscan-a-new-versatile-multi-spectral-archival-film-scanner.

* cited by examiner

CONVERSION OF COLOR FILM TO DIGITAL MEDIA

TECHNICAL FIELD

The present invention generally relates to color, hand tinted, and monochrome photographic film digitization, in particular for motion picture film.

BACKGROUND

Standard color film overtook black and white (B&W) film for motion pictures in the early 1950's. Eastmancolor® was introduced in 1950, which eventually led to the demise of the Technicolor 3 strip film system within the next few years. However, B&W films remained popular up to the 1960's and still continues to be used by some artists.

Various color filtering layers or color-sensitive layers are used to produce conventional color photographic or motion picture film. Generally, three color-sensitive layers, YCM (yellow, cyan and magenta), are used to capture corresponding spectrums of the light of the scene to be imaged.

It is known that the color-sensitive layers of photographic or motion picture films can have light sensitivity spectrum, as illustrated in FIG. 6b, that is different (peak wavelength and/or wavelength sensitivity distribution) from the light sensitivity spectrum of standard RGB (red, green, blue) image sensors of digital cameras as illustrated in FIG. 7 for the theoretical RGB filter. These differences in light spectrum sensitivity (the comparison of which is illustrated in FIG. 8) generally varies from one color to the other, meaning that the information loss when digitalizing films (from the film to a digital RGB image sensor), with a film-to-digital converter for example, is generally not uniform for all three colors. Such variations between corresponding light spectrums imply that the information loss is not only in light intensity but also includes the shifting of color and loss of color accuracy in the digitized image.

Furthermore, these variations of the shape (peak and distribution) of the light sensitivity of these color-sensitive layers can be different from one section of film to another, one film stock to another as well as from one manufacturer to the next. This can imply a disparity between the digitalized images and the films. This can also prevent simple correction (by weighting the measured intensity for the various colors) or calibration of the digital images. As film ages it deteriorates which further damages the color information.

YCM represent different color space than RGB. Therefore, most standard RGB image sensors are ill suited to accurately digitize photographic film since capturing digital images of these films inevitably implies that some of the color and contrast information is lost or exaggerated as well as having incorrect intensity or frequency information. In fact, for some photographic and or motion picture films, the quality of the digitalized color image is significantly degraded and improperly recorded.

Furthermore, the spectral response of some of the standard color filters used in standard digital cameras can be significantly different from the distributions illustrated in FIGS. 7 and 8, which can further exacerbate the issue at hand. In fact, FIG. 9 presents exemplary distributions of light sensitivity (spectral response) of standard RGB color filters of standard cameras, which can be significantly more spread out than a theoretical RGB color filter should be as seen in FIG. 7.

In order to record and preserve most of the information contained in the film, various multispectral methods of digitizing films are used. To do so, a selection of narrowband spectrum light sources is used to sequentially measure and characterize the corresponding light transmission that passes through the film. However, the current method to realize a complete multispectral digitalization of a film is slow, laborious, inefficient and sometime imprecise.

It would be useful to have a method and an apparatus to realize a faster, easier and precise efficient multispectral digitalization of films.

SUMMARY

The applicant proposes a method and an apparatus to realize a faster, easier and more precise multispectral digitalization of films. The proposed method and apparatus ensure quality control of the multispectral film digitization using sensors and can enable the correction of the digital images for film shrinkage and deformation. This can allow for efficient digitization of films which can enable an effective automatization of the mass safeguarding of archived films. The proposed film digitizer apparatus can comprise a novel and improved light source module, which comprise a light assembly that can allow for better illumination of the film and shorter required exposure time that can lead to lower acquisition time for each of the various wavelength image acquisitions for each film image. Monitoring of the spectral distribution and/or the temperature of the light sources can ensure quality control of the digitalization.

The applicant proposes a film digitizer comprising: a controllable film feed mechanism having an exposure region for presenting a frame of a film; a light source for producing an illumination light comprising an array of lights each thermally coupled to a heat sink and orientated to direct a light beam of the lights to at least one optical component for directing light at an output of the light source to provide uniform illumination of the exposure region, and each one of the lights being part of one of a plurality of color sets covering at least a visible spectrum, wherein each one of the plurality of color sets provides a distinctive narrowband of light with all of the lights; an image recorder for recording digital images of the frame of the film in the exposure region by measuring with a monochromatic image sensor a light transmission of the illumination light of the light source through the film; a controller operatively connected to the controllable film feed mechanism, the image recorder and the lights; and at least one of: a temperature sensor for measuring a temperature of the lights; wherein stability of the illumination light is provided by the controller adjustably controlling the controllable film feed mechanism, the image recorder and the lights when the temperature of the lights is above a threshold that can cause a change in their narrowband emission; and a spectrometer arranged to measure a spectral distribution of each of the lights, wherein stability of the illumination light is provided by the controller adjustably controlling the controllable film feed mechanism, the image recorder and the lights when the spectral distribution of at least one of the each of the lights deviates from a tolerated spectral distribution.

In some embodiments, the film digitizer comprises only one type of sensor being the spectrometer arranged to measure the spectral distribution of each of the lights, wherein stability of the illumination light is provided by the controller adjustably controlling the controllable film feed mechanism, the image recorder and the lights when the spectral distribution of at least one of the each of the lights deviates from the tolerated spectral distribution.

In some embodiments, the film digitizer comprises only one type of sensor being the temperature sensor for measuring a temperature of the lights, wherein the stability of the illumination light is provided by the controller adjustably controlling the controllable film feed mechanism, the image recorder and the lights when the temperature of the lights is above the threshold that can cause a change in their narrowband emission.

In some embodiments, the film digitizer comprises both the temperature sensor for measuring a temperature of the lights and the spectrometer arranged to measure the spectral distribution of each of the lights, wherein the stability of the illumination light is provided by the controller adjustably controlling the controllable film feed mechanism, the image recorder and the lights when the temperature of the lights is above the threshold that can cause a change in their narrowband emission or when the spectral distribution of at least one of the each of the lights deviates from the tolerated spectral distribution.

In some embodiments, the plurality of color sets comprises between about eight to about twenty the lights, each color set having a different narrowband spectral distribution and comprised between about 350 nm and about 800 nm.

In some embodiments, the recoded digital images are stored in memory as a hypercube comprising a plurality of the recorded digital images.

In some embodiments, the image recorder further records data identifying a dimension of a non-image portion of the film and/or the light spectrum.

In some embodiments, the proposed film digitizer further comprises a computing device for processing the data, and the computing device identifies at least one dimension of the film from at least one of the recorded digital images.

In some embodiments, the plurality of narrowband spectrum light emission devices comprises enough of the emission devices to provide the illumination light with a sufficient light intensity to have a functional exposure time of less than about 10 milliseconds per image acquisition.

In some embodiments, the light source further comprises a liquid cooling system to exchange heat.

In some embodiments, wherein the controller is operative to sequentially activate the lights to sequentially generate illumination lights, each having a different narrowband spectrum, and, for each of the generated illumination lights, to cause the image recorder to acquire one of the recorded digital images.

In some embodiments, the array of narrowband spectrum lights comprises a plurality of concentric circular arrays centered on a central axis of the at least one optical component comprising at least a light diffuser, wherein the lights being part of each one of the color sets are radially symmetrically arranged in each one of the plurality of concentric circular arrays.

The applicant further proposes a method of multispectral digitization of film comprising: (I) providing the film; (II) providing a light source that can generate a plurality of illumination lights having distinctive narrowband light spectrum with all of the illumination lights covering at least a visible spectrum; (Ill) providing an image recorder; (IV) providing a temperature sensor and/or a spectrometer; (V) exposing in turn, using the light source, at least a plurality of frames of the film to a sequence of the plurality of illumination lights; (VI) capturing, using the image recorder, an image for each of one of the plurality of illumination lights; (VII) saving each of the captured images; (IX) monitoring a temperature of the illumination lights using the temperature sensor and/or monitoring the narrowband light spectrum of the illumination lights using the spectrometer; and (X) executing at least one of: A) adjusting a speed of the exposing and/or the capturing according to the monitored temperature of the illumination lights; B) adjusting a speed of the exposing and/or the capturing according to the narrowband light spectrum of the illumination lights; and C) saving the monitored temperature and/or the monitored narrowband light spectrum as metadata of the corresponding one of the captured images.

In some embodiments, the executing step comprises adjusting a speed of the exposing and/or the capturing according to the monitored temperature of the illumination lights.

In some embodiments, the executing step comprises adjusting a speed of the exposing and/or the capturing according to the narrowband light spectrum of the illumination lights.

In some embodiments, the executing comprises saving the monitored temperature and/or the monitored narrowband light spectrum as metadata of the corresponding one of the captured images.

In some embodiments, for each of the plurality of frames, the saved captured images are stored as a hypercube.

In some embodiments, the proposed method further comprises determining a wavelength of the illumination lights of the captured image using a corresponding one of the saved monitored temperature and a temperature-to-wavelength standard of a corresponding light emission device that produced the illumination light.

In some embodiments, the captured images comprise a non-image portion of the film comprising, a part of a soundtrack and/or perforations of the film.

In some embodiments, the proposed further comprises determining at least one physical characteristic of a non-image portion of the film using the captured images.

In some embodiments, the proposed method further comprises correcting for any film deformation of at least one of the captured images using at least one physical characteristic.

BRIEF DESCRIPTION OF THE DRAWINGS

The invention will be better understood by way of the following detailed description of embodiments of the invention with reference to the appended drawings, in which.

DETAILED DESCRIPTION

Figure 1A:
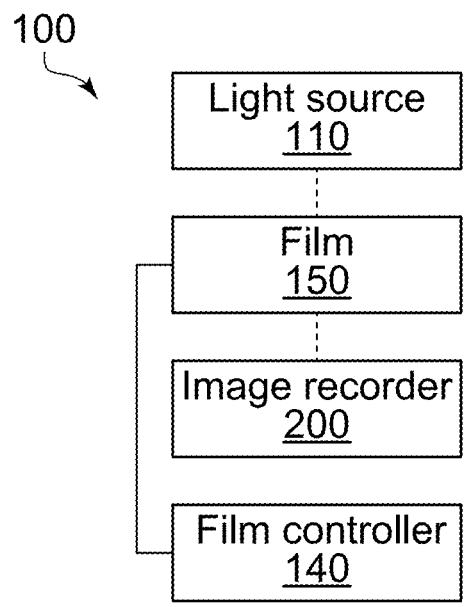
FIG. 1A is a block diagram showing possible elements of an embodiment of the proposed film digitizer.

The following is a detailed description of embodiments of the disclosure depicted in the accompanying drawings. The embodiments are in such detail as to clearly communicate the disclosure without limiting the anticipated variations of the possible embodiments and may encompass all modifications, equivalents, combinations and alternatives falling within the spirit and scope of the present disclosure. It will be appreciated by those skilled in the art that well-known methods, procedures, physical processes and components may not have been described in detail in the following so as not to obscure the specific details of the disclosed invention.

Unless the context requires otherwise, throughout the present disclosure and claims which follow, the word "comprise" and variations thereof, such as "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Although the films and the digital images may be used or intended to be displayed to a viewer, which can usually only perceive the visual light spectrum (wavelength from about 380 nm to about 700 nm), it will be appreciated that the proposed apparatus and method can be used to transfer, digitalize and safeguard the color information that is outside of this visual light spectrum. Therefore, some embodiments can be used to digitalize information about the visual light spectrum and about the ultraviolet light (UV), the near-infrared light (NIR) and/or infrared light (IR). It will be appreciated that the "invisible" parts of the spectrum can be used to locate physical dirt and dust on the film, which may be considered when filtering or processing of the data to correct the captured images, for example.

In the present disclosure and in the following claims, the term "film" is defined as any type of "monochromatic" or color photographic films or motion picture films known in the art may then be archived films or modern films. It will be appreciated by someone skilled in the art that the proposed apparatus and method can be used for digitizing a "positive" (color) film and/or a "negative" (color-reversed) film. A film can also include what is known as elements used for laboratory or other purposes such as internegative, duplicate negative, printing negative and others commonly used in the art.

Note that if the photosensitivity of the film is monochromatic (i.e., black and white), as a practical matter, the physical celluloid may have some coloration for a variety of reasons including the aging of the film and contamination during processing and other coatings put on the film for protection and other purposes. As a practical matter there can usually be a tint of some sort on "black and white" film. Basically, it may not be pure black and white. Since the intent of this invention is to capture all of the color information of the original accurately, we capture the subtle tint as well. So the term "black and White" or "monochrome" may be considered a misnomer. If these films are closely examined, some color can be detected. Therefore, the proposed method and apparatus can be used to capture and characterize even "black and white" films.

In the present disclosure and in the following claims, the term "frame" or "frame of the film" refers to any individual images from a film (film image) any parts/portions of the images of the film. In a general understanding, the "frame" can also include the audio/soundtrack and/or the perforations of the film. It will be appreciated that, though the present disclosure and in the following claims, a frame can be digitized in sections: portion by portion (e.g., quadrant by quadrant) and can be later reconstructed/recombined/stitched back together (e.g., as a mosaic of sub-images), which could allow to increase the resolution of the color information and hypercube and resulting image(s).

The applicant proposed a method and apparatus to realize a faster, easier and precise multispectral digitization of films. This can allow for efficient digitization of films which could enable the effective automatization of the mass safeguarding of archived films.

The proposed film digitizer apparatus can comprise a novel and improved light source module, which comprise a light assembly that can allow for better illumination of the film and shorter required exposure time that can lead to lower acquisition time for each of the various wavelength image acquisitions for each film image.

Some embodiments of the proposed light source can further comprise one or more of a variety of sensors, for monitoring and/or calibrating the light source module.

One of the issues with the state of the art of multispectral digitization of films is the slow pace at which the current technologies are allowing to complete the process while the physical integrity of films is rapidly degrading, especially old archive films. Without a faster and safer way to digitize films, their color information or the films themselves could be irreversibly lost.

Namely and for example, the state of the art of multispectral digitization of films may only provide a single narrowband spectrum light source at a time, which may require an operator to manually replace/interchange one light source to the next. Such a manual or non-automated way (e.g., with operator switches) of changing light sources can induce a variety of issues that can negatively affect the effectiveness (e.g., speed, repeatability, uniformity, control or precision) of the entire digitizing process.

Multispectral Film Digitization

Figure 6A:
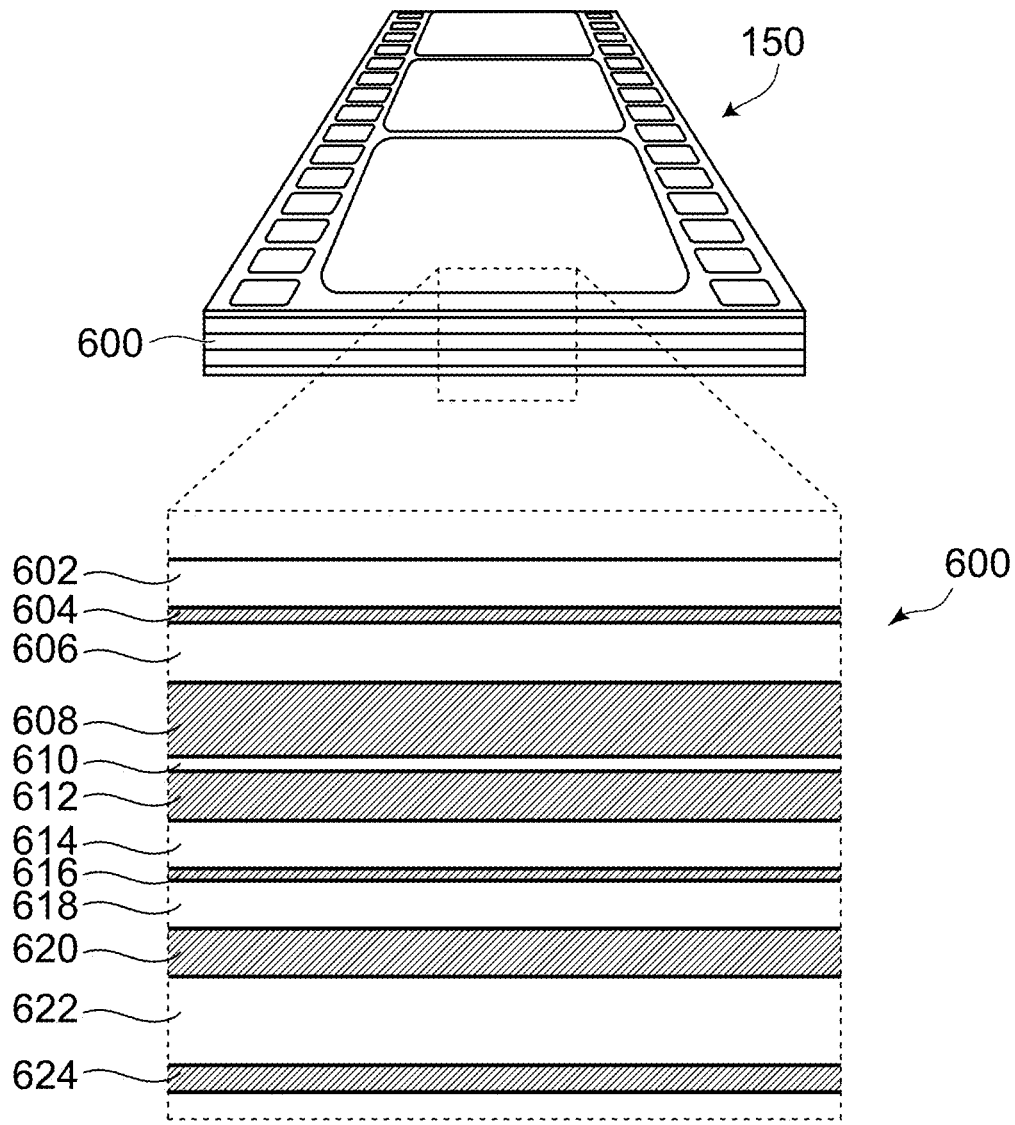
FIG. 6A shows a cross-section of the thickness of a film comprising a plurality of various layers to record the color information.

As illustrated in the example of FIG. 6A that shows a cross-section 600 of the thickness of a film, such films can comprise a plurality of various layers to record the color information. In some embodiments, the films comprise some of: a clear protective topcoat 602, a UV filter 604, a "fast" blue layer 606, a "slow" blue layer 608, a yellow filter 610 to cut blue light from passing through to a "fast" green layer 612, a "slow" green layer 614, an inter/subbing layer 616, a "fast" red layer 618, a "slow" red layer 620, a clear triacetate base 622, and an antihalation backing 624.

Over time the film technology changed so that different film stocks from the same manufacturer as well as different manufacturers had different/various layers based on the various types of films that could and can be used for various purposes (e.g., the chemistry to be used, and the process application for which the film was used).

Figure 6B:
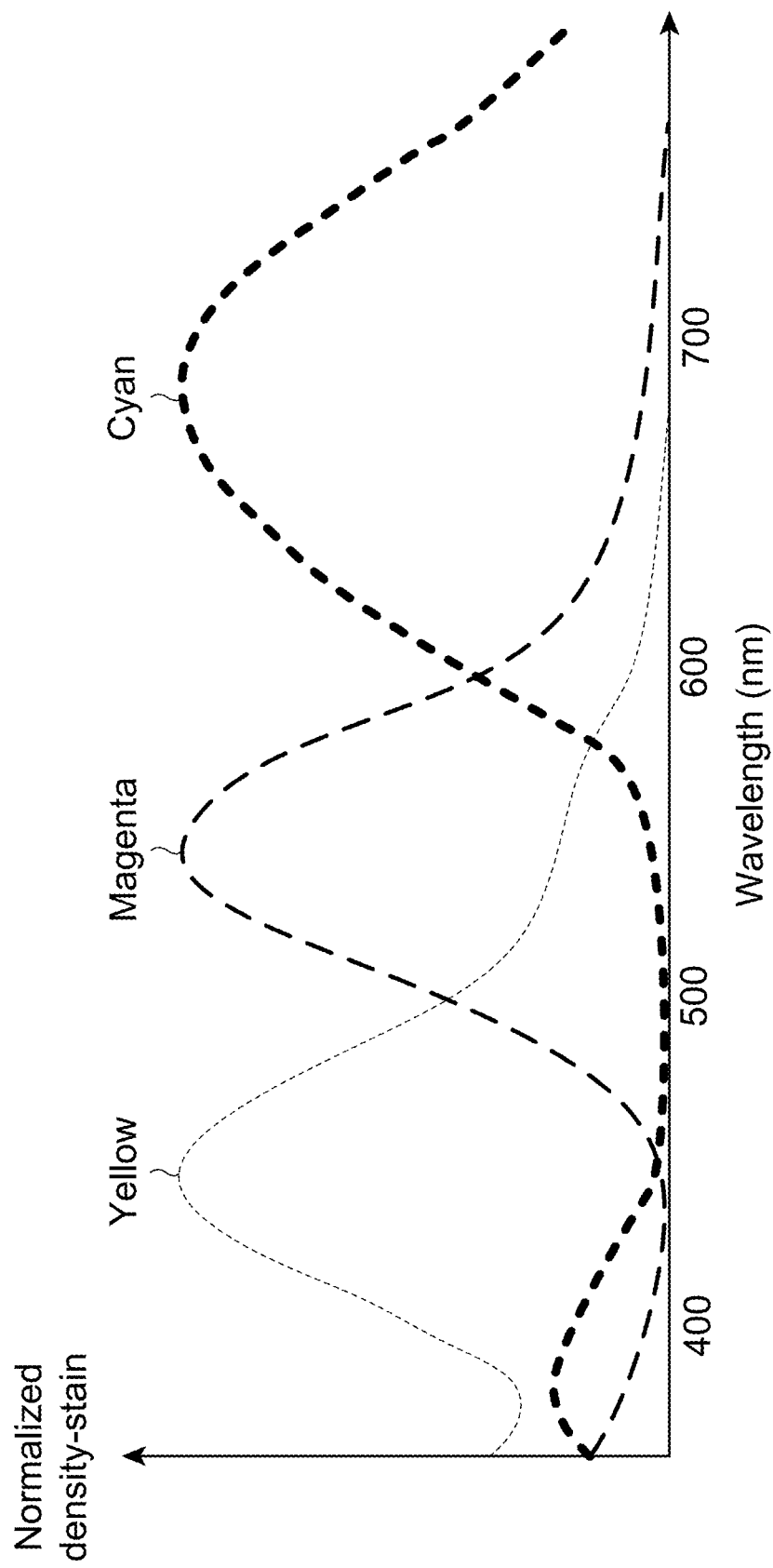
FIG. 6B is the spectral distribution of the various color layers of the film.

These blue, green, and red sensitive layers can turn the exposed silver halide crystals to their complementary colors (yellow, magenta, and cyan) when the film is developed. Once developed, the film can have a spectral distribution (i.e., light spectrum) for each of these colors similar to the one illustrated in FIG. 6B which shows a theoretical film sensitivity, where these yellow, magenta, and cyan layers can each have their own color spectrum. It will be appreciated that these spectral distributions may vary significantly (i.e., change of the shape and the sensitivity of their spectral distribution: the position of their maxima, their slope and their width) from one film to the next (e.g., depending on the model of the film or the manufacturer of the film).

It will be understood that ultimately a single value may be stored for red, green, and blue for each pixel using RGB digital cameras. Because the RGB filters can have wide spectral distribution, the wrong value may be stored because of a weighting or averaging that can occur. Ultimately the brightest value can "win over" and overpower colors that may be present but are "'overpowered" by bright ones.

To use an audio analogy, tone control used to be controllable with a single knob to control the treble and bass. Highlighting a single sound (e.g., the sound of a cymbal that was part of other sounds) was not allowed by the technology available at the time without boosting all of the other high frequencies. Also a first sound would obscure another sound in the same spectral space because it was significantly louder. The wider the filter, the worse the problem. In any given area, the loudest (or brightest in the context of light) has to win out. As when multi-band equalizers are used, the filter can be narrowed significantly, which can allow for the isolation/distinction of the sounds, similarly in light it can allow for a more accurate capturing of the colors.

Figure 7:
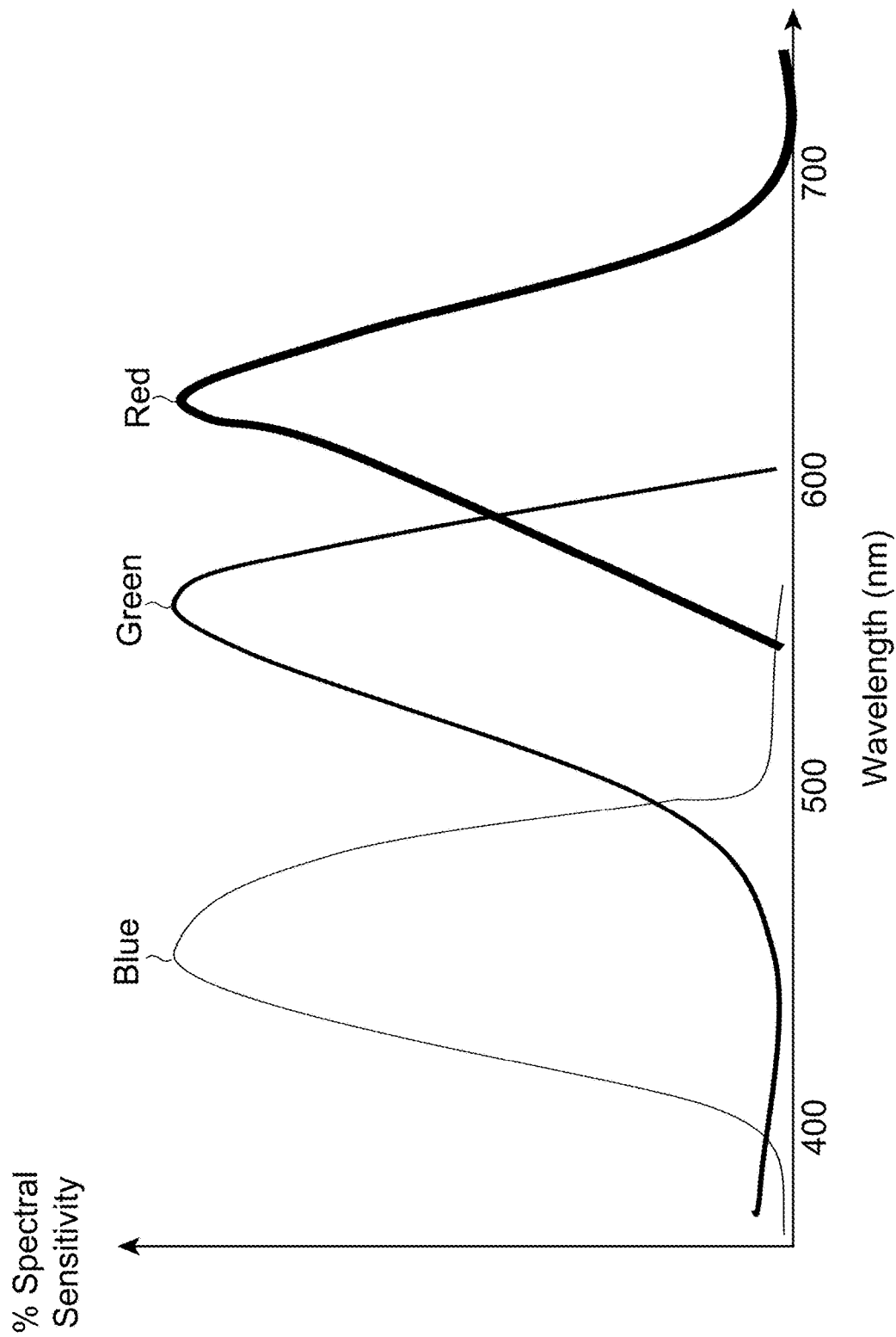
FIG. 7 is the spectral distribution of some of the typical color filters of digital cameras, which normally comprise an array of blue, green and red color filters.

FIG. 7 illustrates the spectral distribution of some of the typical RGB color filters of digital cameras. The color filters of digital cameras, which normally comprise an array of RGB color filters, can vary significantly from one camera model to the next (see FIG. 9A that shows the real spectral distribution of the RGB color filters of an off-the-shelf digital camera) but can be essentially centered around about the curve of FIG. 7.

Figure 8:
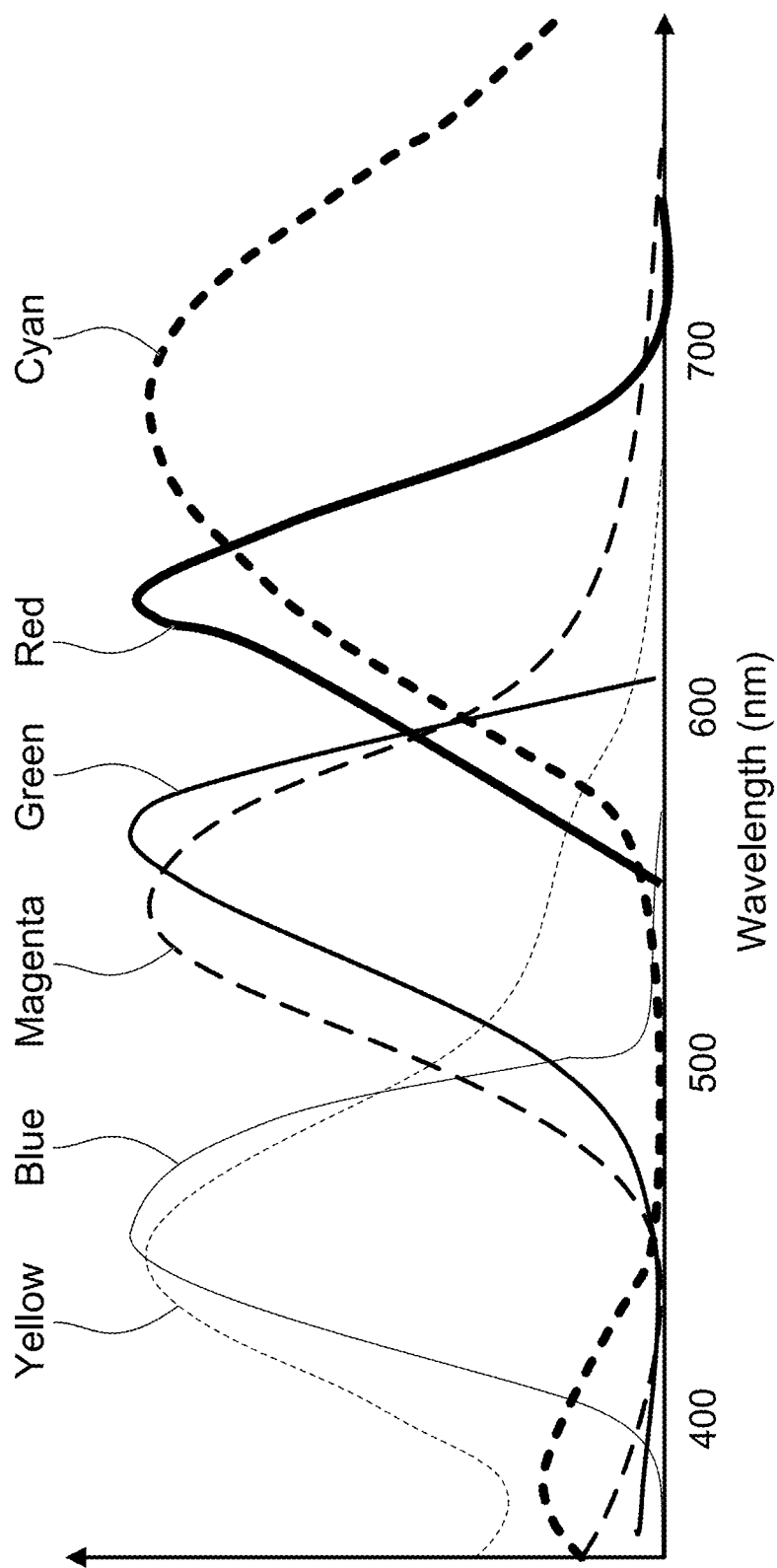
FIG. 8 shows the normalized and superimposed spectral distribution of FIGS. 6B and 7.

FIG. 8 presents the normalized and superimposed spectral distribution of the various color layers of an exemplary film (from FIG. 6B) and the possible spectral distribution the RGB color filters of a digital camera (from FIG. 7).

Figure 9A:
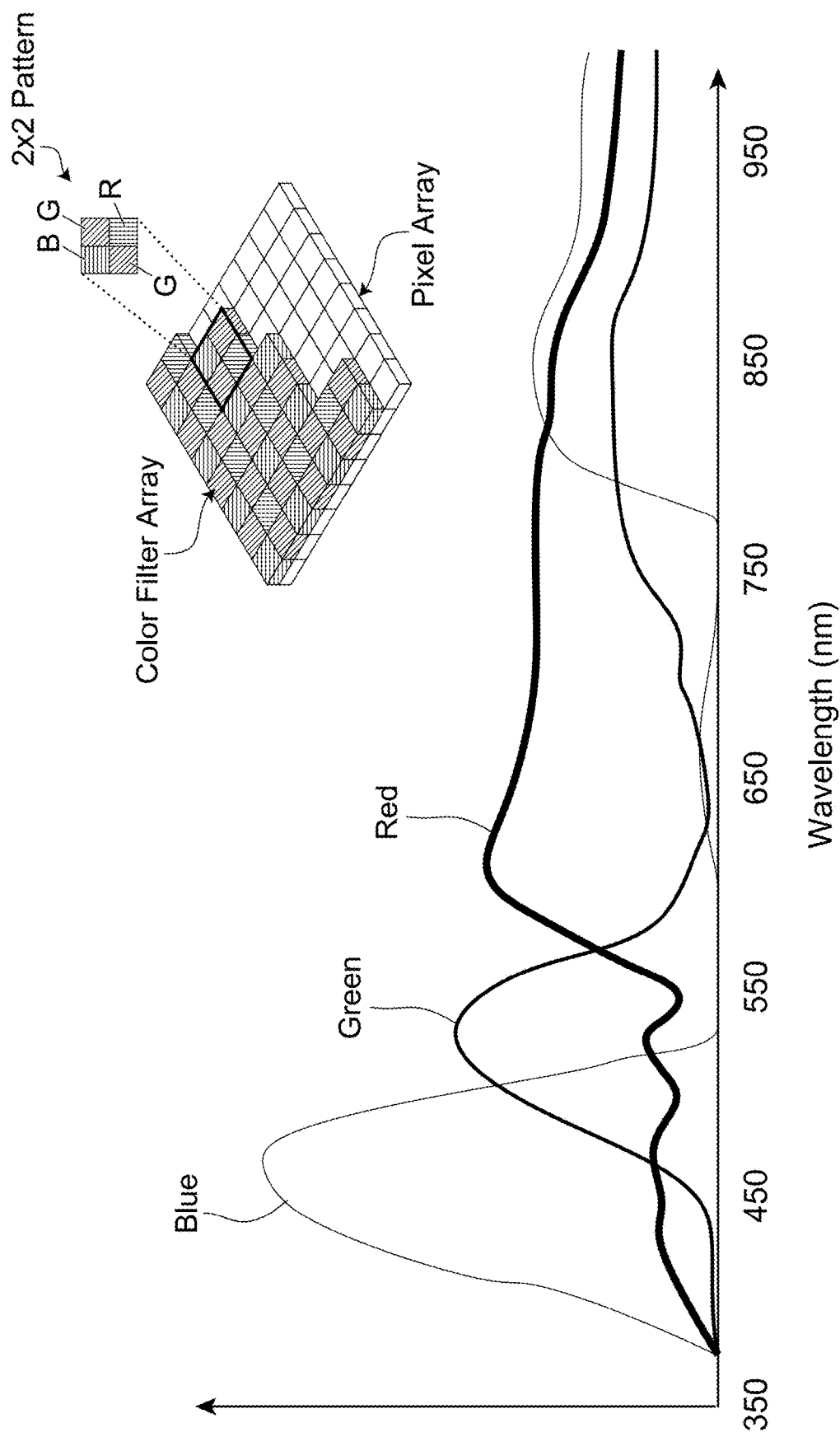
FIG. 9A shows the adjusted and characterized spectral distribution of the blue, green and red Bayer color filters of an off-the-shelf digital camera.

Similarly to FIG. 7, FIG. 9A shows the adjusted and characterized spectral distribution of the RGB color filters of an off-the-shelf digital camera (i.e., Nikon D300). It will be appreciated that such color filters can have tails of their spectral distribution that extends ("infringes") significantly to the wavelengths of the other color filters. Furthermore, these color filters are ill suited to properly filter/discriminate for light in the NIR and the IR.

Figure 9B:
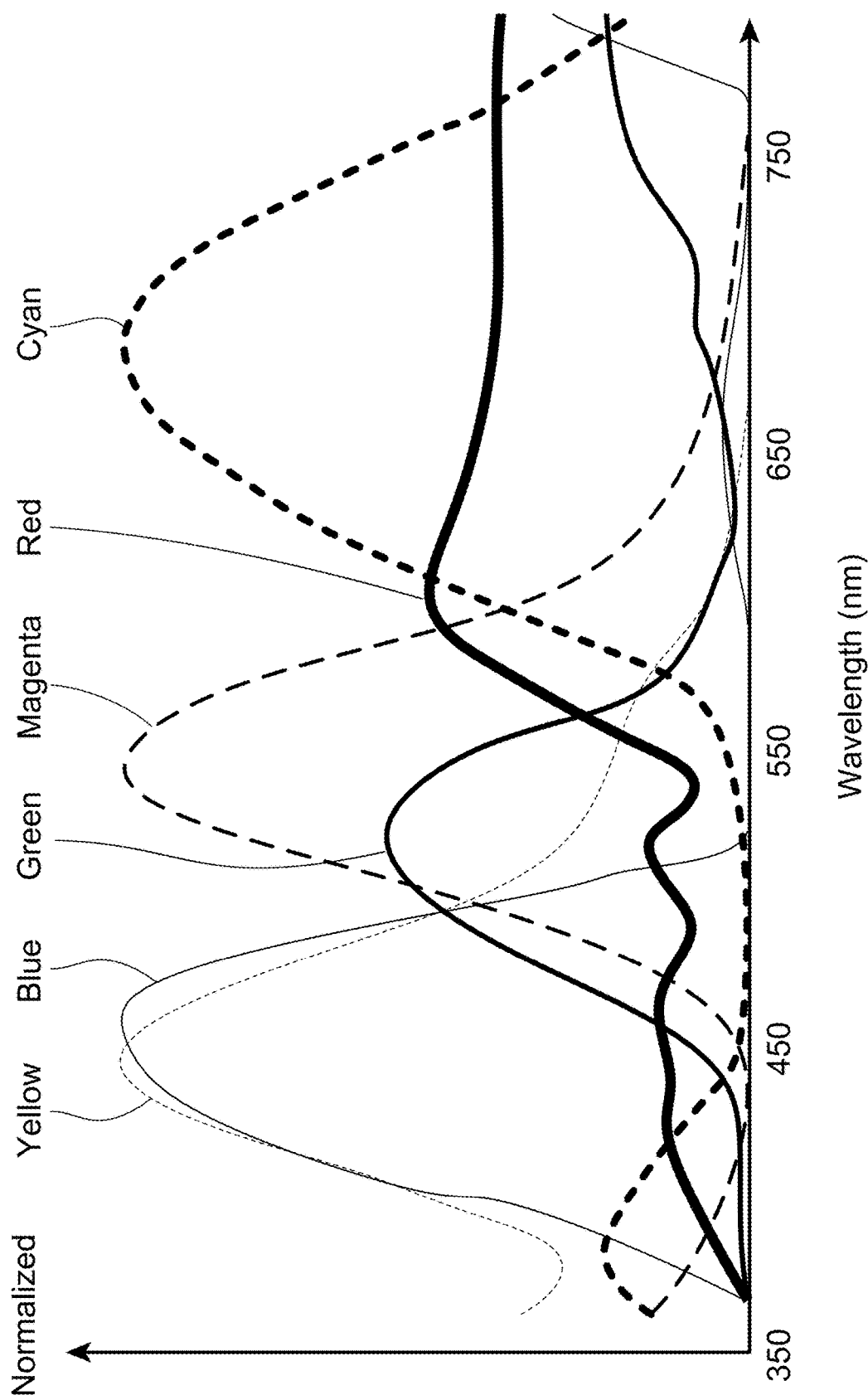
FIG. 9B shows the normalized and superimposed spectral distribution of FIGS. 6B and 9A.

FIG. 9B shows the normalized and superimposed spectral distribution of the various color layers of an exemplary film (from FIG. 6B) and of the spectral distribution the RGB color filters of a Nikon D300 camera (from FIG. 9A).

FIGS. 8 and 9B can be used to visualize one of the main issues with the RGB film digitization of films since it clearly shows that the disparity between the spectral distributions of the YCM (yellow, cyan and magenta) colors of the films and the spectral distributions of the RGB color filters (i.e., disparity, gap and difference between the shape of their spectral distributions: position of their maxima, their slope, their tail and their width.

Figure 10B:
FIG. 10B shows a "pure" black and white image (pure intensity image) resulting from the digitalization of the same film with a camera that had its color filter removed.
Figure 10A:
FIG. 10A shows a black and white image resulting from the digitalization with a stock RGB camera of a film that captured an outdoor scene.

To illustrate the loss of color information that can normally result from digitizing a film using an off-the-shelf RGB digital camera, reference is now made to the example of FIGS. 10A and 10B which respectively present a digital "black and white" image resulting from the digitalization with a stock RGB camera, and a "pure" black and white image (pure intensity image) resulting from the digitalization of the same film with a camera that had its color filter removed.

Comparing these two images can make it evident to someone skilled in the art that a significant portion of the color information is lost when using a stock RGB camera. In fact, the contrast and the color saturation of the picture may appear better in the image of FIG. 10B.

In some cases, a tinting that may not be intentional can appear on some of the digitized images and can depend on the technology or the specific chemical deterioration process which may be quite common for "black and white" films. Such a tint can change wavelength/color of the image since it is an analog chemical process. The change from section to section could be due to the deterioration (e.g., the vinegar syndrome or any other types and source of deterioration known in the art). Sometimes this tinting can be applied by hand or other dying process for an actual effect, particularly in the days before color existed, for aesthetic purpose, for example.

The proposed film digitizer can capture as much color information as possible or required, even if it is not "intentional" and may be a byproduct of some other chemical deterioration or other process. Since the original film is continuing to deteriorate, it can be important to capture the data—whatever it may be—before the film gets worse and becomes unusable.

Figure 11A:
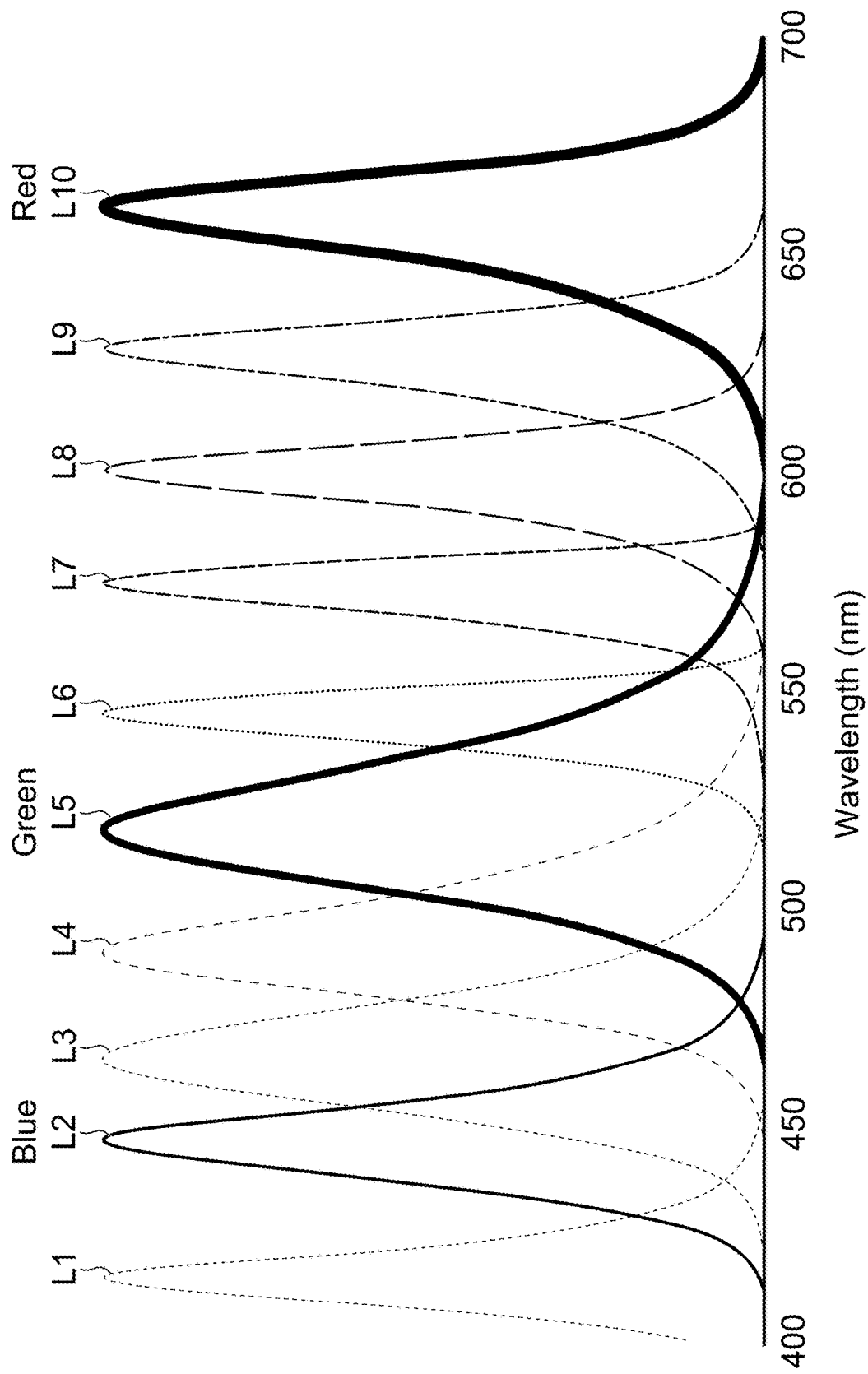
FIG. 11A shows a preferred embodiment of a selection of ten various possible light sources having narrowband spectrums distributed within the visual spectrum.
Figure 11B:
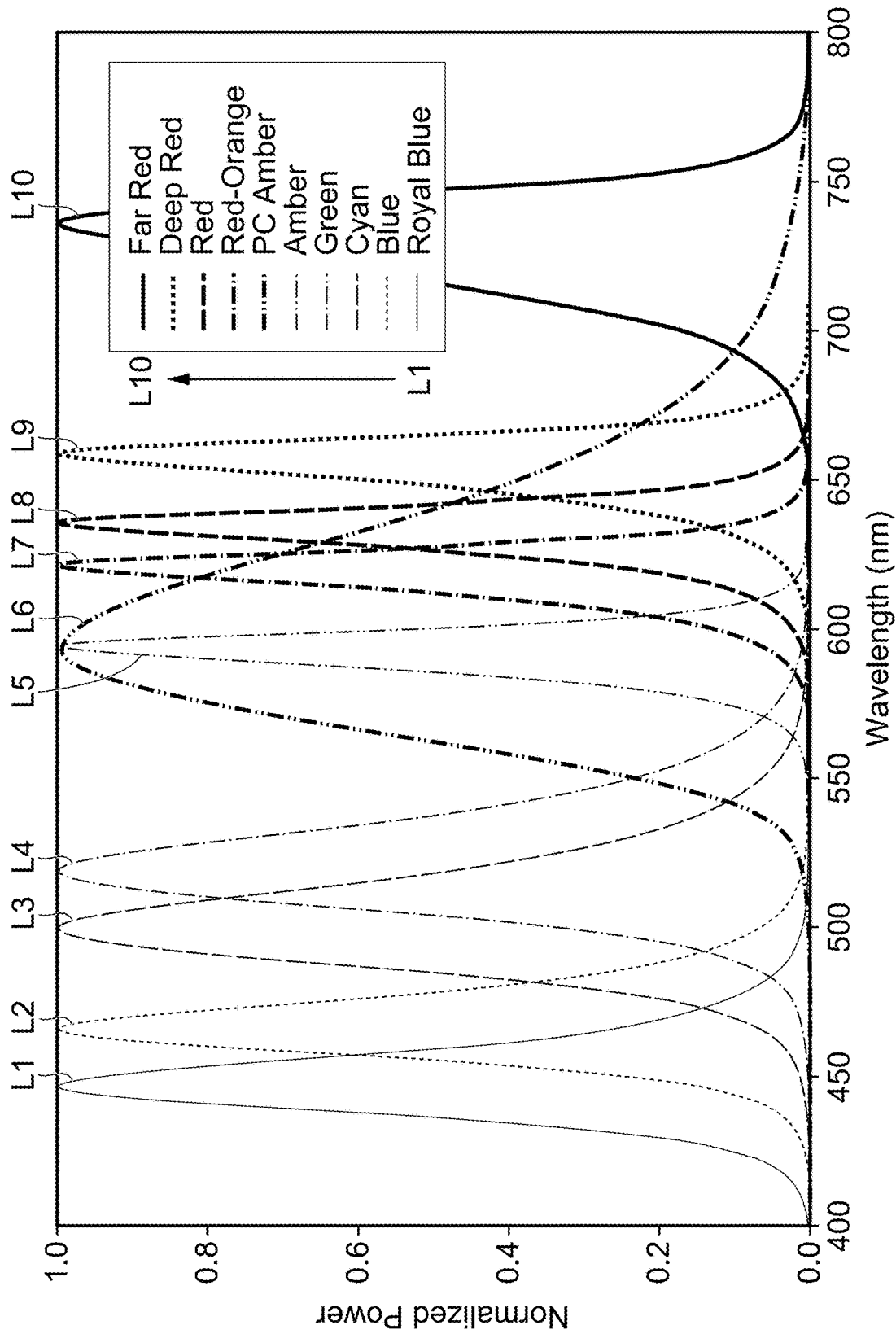
FIG. 11B shows a selection of ten various possible LED light sources having narrowband spectrums distributed from about 400 nm to about 750 nm.

The multispectral film digitization was proposed to prevent the loss of color information between the film and the digital camera. The idea is to capture light from a range of wavelengths, visible and optionally invisible to the human eye, across the electromagnetic spectrum to measure light transmission (color information) of the films for the corresponding narrowband spectral distribution. This can be completed by sequentially using a selection of light-emitting diodes (LED) having narrowband spectral distribution that incrementally spread over the chosen span of the light spectrum (e.g., from about UV to about NIR) as illustrated in FIGS. 11A and 11B. The resulting "stacks" of images captured with various light sources comprising the digitalized color information, here referred to as a hypercube 999, are used to analyze and to accurately determine the color composition of the source (i.e., the image(s) of the film).

It will be appreciated that simply using yellow, cyan and magenta light sources would not solve the loss of color information either because, as we have seen, the response is a curve and not uniform across the spectrum. From a data perspective, the selection of the three-color types (e.g., YCM or RGB) cannot sufficiently mitigate—the loss of color information. The data value (e.g., intensity of the transmitted light over the spectrum) for any given pixel location may be what is most important.

While FIGS. 11A and 11B show a selection of between eight to fourteen (e.g., ten) color sets L1-L10 of various possible narrowband spectrums (colors) distributed in the visual spectrum (from about 400 nm to about 750 nm, respectively). It will be appreciated that the number of color sets that can be used for digitalization may vary as required.

It will be appreciated that, in some embodiments, the number of selected color sets can vary as a function of the desired color resolution.

In some embodiments, the light source 110 can comprise more than 3 color sets, each corresponding to a non-identical spectral distribution (i.e., color).

Preferred embodiments of the film digitizer 100 comprise preferably between about 6 up to about 20 various color sets.

In some embodiments, only a subset of the selected color sets may be used to complete the digitalization. Generally, the higher the number of various color sets the higher the resolution or filters the color information and of the hypercube—the higher granularity the more accurate the data can be. In some embodiments, the number of color sets (i.e., various collections of light emitting devices 115 having a similar or same narrowband spectrum) used to complete the multispectral imaging/digitizing—hyperspectral imaging—(to realize the light filtration) can reach a few hundreds up to a few thousands color sets.

Figure 12:
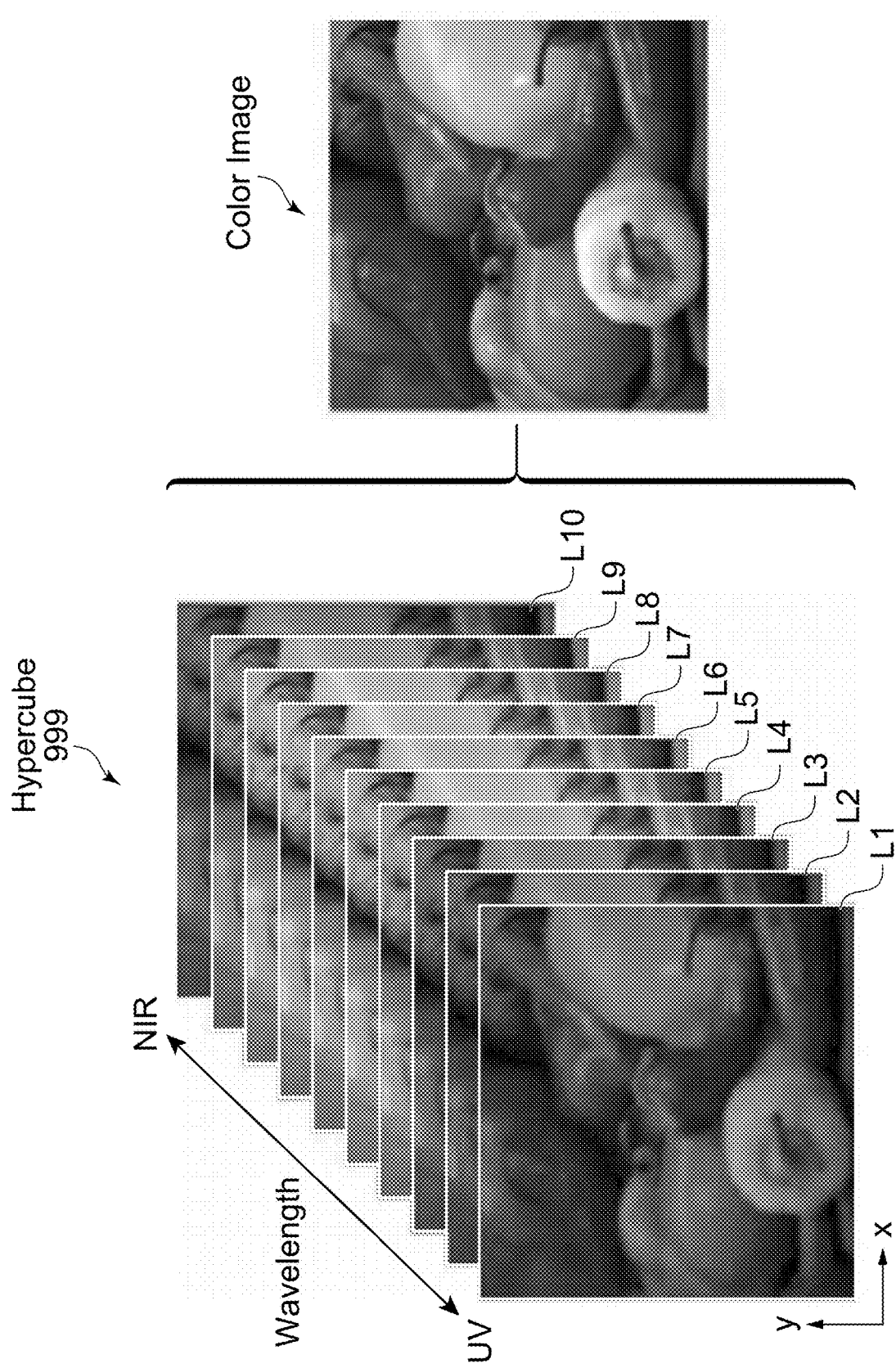
FIG. 12 presents, on the left: a visual representation of a "hypercube" comprising a compilation of various digitalized images (from UV to NIR) of an image transmitted from a film, each one for a single narrowband spectrum light source, and on the right: the corresponding recreated or source color image.
Figure 13:
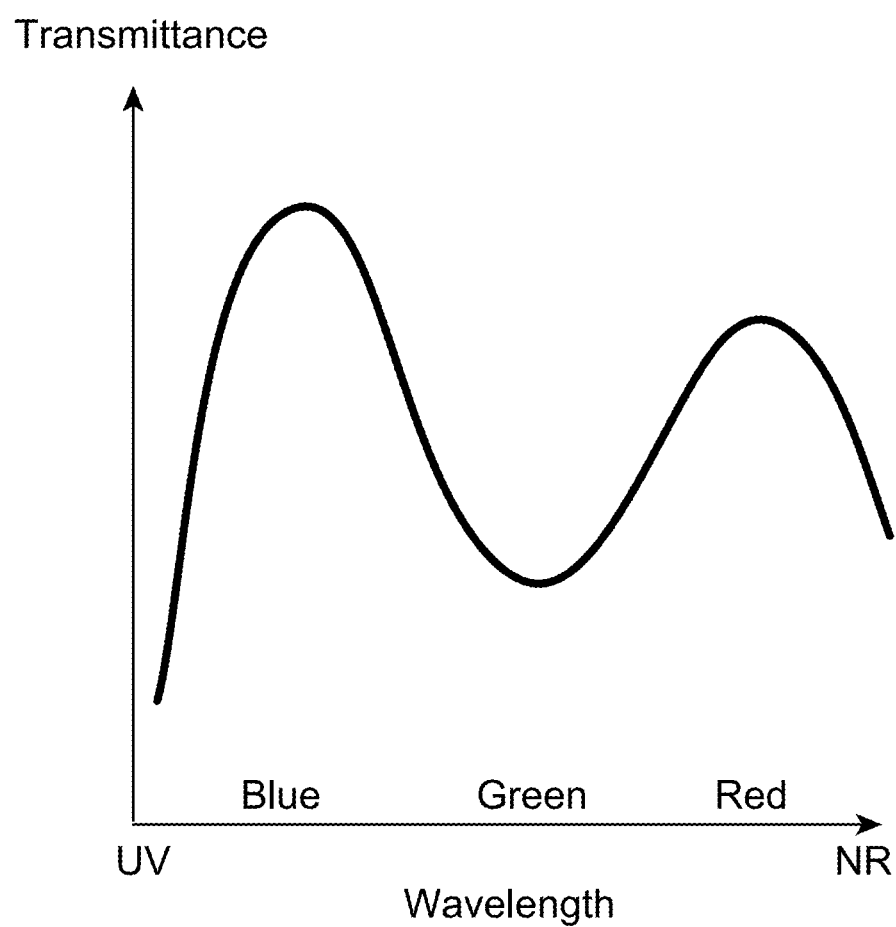
FIG. 13 transmittance of a typical film as a function of wavelength.

FIG. 12 presents—on the left—a schematic representation of an embodiment of a hypercube 999 (data comprising a compilation of the 2D transmission image, i.e., color information, for each acquisition for various wavelengths (color sets L1-L10) of the light source—a 3D array of digital images for various colors), and—on the right—a corresponding color image (a film image source or a digital image generated from a combination of the digital images recorded with a film digitizer).

Embodiments of the Multispectral Film Digitizer

As illustrated in FIG. 1A, the proposed multispectral film digitizer 100 can comprise at least one of a light source 110, an image recorder 200 and a film controller 140 (e.g., feed mechanism) in order to move and feed a film 150. These last elements/modules can all be directly and/or indirectly connected and/or coupled with one another. Two or more of these components/modules can be interconnected via any suitable means known in the art (internet, ethernet, Wi-Fi, Bluetooth, etc.). Two or more of these components/modules can be integrated within a common housing or a single apparatus. The light source 110, the film 150 and the image recorder 200 can minimally "interact" with one another via the beam of light. The beam of light can be generated by the light source 110 and directed at the film 150 before passing, at least in part, through the film 150. The light that passes through the film 150 (the transmitted light) can then be measured/captured by the image recorder 200.

Figure 1B:
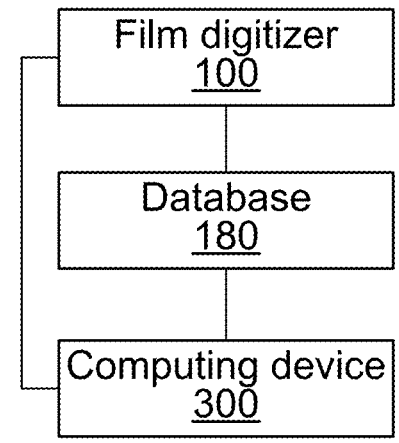
FIG. 1B is a block diagram showing possible elements of an embodiment of an assembly that can utilize the proposed film digitizer.

As illustrated in FIG. 1B, the film digitizer 100 can be used in combination with a database 180 and/or a computing device 300 that can act as a controller to the system. Two or more of these components/modules can be interconnected via any suitable means known in the art (internet, ethernet, Wi-Fi, Bluetooth, cables/wires, etc.). Two or more of these components/modules can be integrated within a common housing or a single apparatus. The database 180 can be any memory for storing data. The data can include one or more of data acquired with the film digitizer 100, data generated, modified and/or filtered by the computing device 300 and any other data.

A controller (e.g., computing device 300) can comprise memory (e.g., non-transitory memory), logic circuitry (analog programming) and/or one or more of a processor, which may be a general-purpose programmable processor (microprocessor, DSP, FPGA, etc.).

In some embodiments, various parameters (e.g., controlling the acquisition speed, the intensity of the illumination light) of the digitization process can be adjusted and controlled by the controller of the film digitizer 100. The controller can be configured to adjustably control the various components of the film digitizer by sending control commands, for example. The adjustments can be based, in part or completely, on a measured (e.g., in real-time) temperature and/or the spectral distribution of the lights of the light source 110.

Figure 1C:
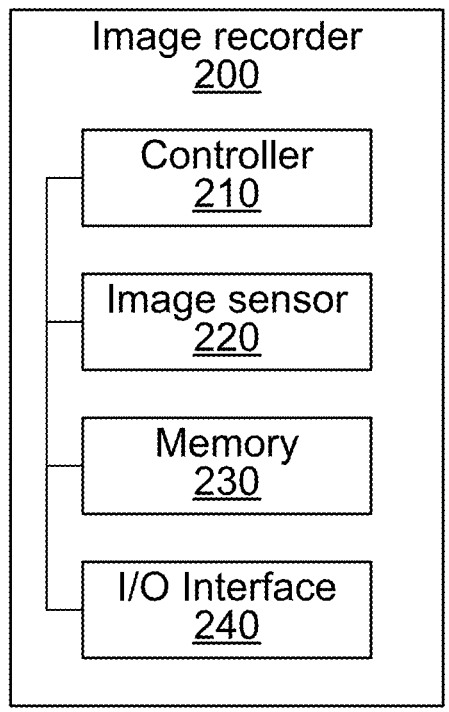
FIG. 1C is a block diagram showing possible elements of an embodiment of the image recorder of the proposed film digitizer.

FIG. 1C presents one embodiment of an image recorder 200 of the proposed film digitizer 100, which can comprise at least one of a controller 210, an image sensor 220, a memory 230, and an input and/or output (I/O) interface 240.

The controller 210 of the image recorder 200 can be used to activate, control and synchronize (e.g., with at least one of the other components of the image digitizer) the image recorder. The controller 210 comprises an analog and/or digital controller. The controller 210 can comprise one or more of a processor, which may be a general-purpose programmable processor (microprocessor, DSP, FPGA, etc.).

The image sensor 220 of the image recorder 200 can be used to record an image of the transmitted light of the film (portions of the illumination light that passed through the film). The image sensor can comprise any type of photodetector (e.g., array of photoelectric sensors), an interface, a lens (analog lens, liquid crystal lens, etc.) or a lens assembly, circuitry, and/or a housing (that may be surrounding the components of the image sensor and/or be coupled with another component/module of the image recorder). In a preferred embodiment, the image sensor can have its focal plane at the film.

The memory 230 of the image recorder 200 can be any suitable type of memory known in the art (random-access memory (RAM), read-only memory (ROM), solid-state drive (SSD), hard disk drive (HDD), etc.) and can be used to save the data acquired/measured by the image sensor 220, to store operation codes and commands to properly operate the image recorder 200 and/or any other type of information.

Figure 1D:
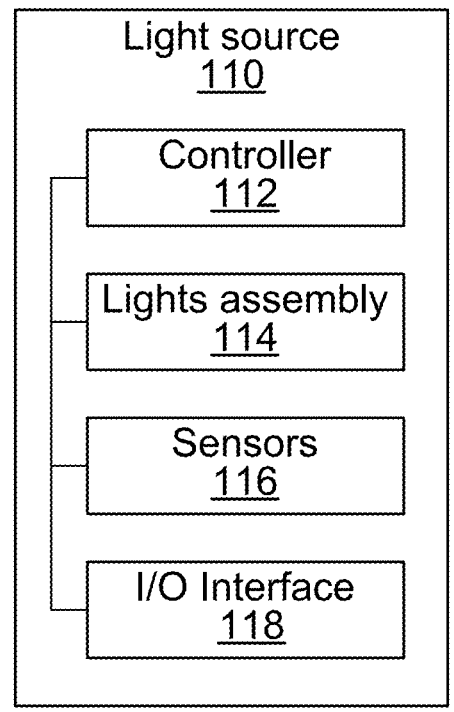
FIG. 1D is a block diagram showing possible elements of an embodiment of the light source of the proposed film digitizer.

FIG. 1D presents one embodiment of a light source 110 of the proposed film digitizer 100 used to generate an illumination light (i.e., light output of the light source) to illuminate the film. The light source can comprise at least one of a controller 112, light assembly 114, sensors 116, and an input and/or output (I/O) interface 118. In some embodiments, the illumination light can be mostly spatially uniform in order to uniformly illuminate the film. In some embodiments, the illumination light can be a monochromatic light beam or a beam of light having a narrowband spectral distribution. An intensity of the illumination light can be adjusted or controlled to ensure sufficient light transmission intensity to the image detector.

The controller 112 of the light source 110 can be used to activate, control and synchronize (e.g., with at least one of the other components of the image digitizer) the light source. The controller 210 comprises an analog and/or digital controller. The controller 210 can comprise one or more of a processor, which may be a general-purpose programmable processor (microprocessor, DSP, FPGA, etc.).

The light assembly 114 of the light source 110 be used to maximize the use of the lights 115. The light assembly can comprise any type of array of various light emitting devices 115, such as, for example, a narrowband spectrum light, assembly/array of lights, LEDs, "normal" lights filtered by a narrowband filter or a combination thereof (e.g., 2D or 3D array of clusters of lights).

The light assembly 114 can comprise an interface, a light modulating assembly (lens assembly, liquid crystal lens, diffuser, etc.) or a lens assembly, circuitry, and/or a housing 111 (e.g., it can have a reflective internal surface to reduce loss of light intensity and that can be or resemble an integrating sphere) in which at least some of the components of the image sensor may be enclosed and/or be coupled with another component/module of the light assembly.

In some embodiments, the lights 115 of the light assembly can comprise one or more various lights (e.g., LEDs) having a narrowband spectral distribution. The lights of a color set, for producing a given color, can comprise a collection/plurality of lights 500 (e.g., a constellation or an array or a cluster) plurality of light emitting devices 115.

The sensors 116 of the light source 110 can be used to provide calibrating and monitoring data in order to give quality assurance. The sensors 116 can comprise a temperature sensor (e.g., thermometer) that can be used to monitor the internal temperature of the light source (e.g., each individual lights 115 or clusters of light emission devices 500), light intensity sensors to monitor the uniformity of the illumination light and/or a sensor to measure the spectral distribution (e.g., spectrometer) that can be used to measure/sample (e.g., in real time)—and possibly record—the spectral distribution of any one of the lights of the light assembly or the illumination light (light output) in order to detect a shift in the wavelength (e.g., for calibrating). In some embodiments, the sensors can be located near/beside the illuminated part of the film and/or at the output of the light source to monitor the light output (i.e., illumination light).

If the temperature of the light source, namely the illumination light or the light emission devices, is deemed too high (e.g., above a certain threshold) or to be increasing at a rate that is deemed too high, which may induce a shift of the wavelengths of the lights, the digitization process can be slowed down (e.g., reducing the light intensity and increasing the exposure time or taking a pause between some of the image acquisition to allow the temperature to drop) or stopped for a chosen period of time.

For example, a maximal/critical temperature threshold, which may be associated with a temperature at which a change of the narrowband light emission of the lights of the light source can be expected, can be considered to adjust (e.g., trigger) the digitization process (e.g., by controlling the controllable film feed mechanism, the image recorder and the lights), e.g., with a controller of the film digitizer.

In some embodiments, the measured temperature can be stored as complementary data (e.g., metadata) to the data of the corresponding captured image, which may be used to ensure quality control of the multispectral film digitization.

It will be appreciated that a correlation between the temperature of a given light emission device and the spectral distribution of its emitted light (i.e., the possible shift of the wavelengths of the light as a function of temperature) may be known or can be determined. Therefore, in some embodiments, a temperature may be used to determine (e.g., approximate/extrapolate) the spectral distribution of the emitted light by knowing the temperature and the model/type of the corresponding light emission device(s). In some embodiments, the measured temperature can be stored as complementary data (e.g., metadata) to the data of the corresponding captured image, which may be used to ensure accurate wavelength correspondence for the multispectral film digitization.

Similarly, in embodiments where the sensors 116 include a spectrometer, the digitizing process can also be adjusted (e.g., slowed down) if a change (e.g., shift or deviation) in the spectral distribution of the illumination light is detected. Note that changes in the spectral distribution may occur if a light source heats up (e.g., above a certain threshold).

It will also be appreciated that once the spectral distribution (wavelength) of a light emitting device (light source, illumination light) is known (e.g., measured with a spectrometer), or determined (e.g., approximated/extrapolated from a measured temperature), for a given acquisition (captured digital image), the control of the digitizing process can be optional since this information may be used/considered post-acquisition (e.g., once the digitizing process is completed) to accurately adjust/correct the rendered image or the hypercube using similar processes used in multispectral film digitization. In other words, the wavelengths considered for the multispectral film digitization may vary and may be monitored/recorded throughout the data acquisition without having to adjust the acquisition process. In some embodiments, the measured spectral distribution of the illumination light can be stored as complementary data (e.g., metadata) to the data of the corresponding captured image, which may be used to ensure accurate wavelength correspondence for the multispectral film digitization.

For example, a maximum deviation from an expected/tolerated spectral distribution can be considered to adjust (e.g., trigger) the digitization process (e.g., by controlling the controllable film feed mechanism, the image recorder and the lights), e.g., with a controller of the film digitizer.

It will be appreciated that, each temperature of a given light emitting device (light source or color set) can be correlated with an approximative wavelength of the generated light (light output) using, for example, a corresponding temperature-to-wavelength standard, which may be provided by the manufacturer of the light emitting device or can be determined/calibrated for each of the light emitting devices of the light source. Therefore, it will be appreciated that the wavelength of this illumination light can be determined/approximated using a measured temperature of an illumination light using a corresponding temperature-to-wavelength standard.

It will be appreciated that the measured (constantly, incrementally/periodically or once per frame acquisition or per film) temperature or wavelength of the light emitting device can be used to determine its state. Namely, if a light emitting device is functional, deteriorating, or defective. In some cases, a signal (e.g., a flashing light, a sound or an error message) can be sent to the user to indicate that there is an issue with a component of the apparatus and may instruct the user to replace the associated component (e.g., an error message instructing to replace a deteriorating or defective light emitting device). In an embodiment, the light source can comprise a heat exchanger (e.g., air exchanger—a fan, a fluid exchanger—liquid cooling) to ensure that the hot air is exiting the light source and that fresher air is added. In some embodiments, the heat exchanger can comprise a liquid cooling system that can comprise but is not limited to recirculated water similar to that used for cooling "over cranked" computer chips used in gaming computers.

The I/O interface 118 (USB, cable/wires, internet, ethernet, Wi-Fi, Bluetooth, etc.) of the light source 110 can be used to connect with one or more of the other modules of the film digitizer, the database and/or computing device.

Figure 1E:
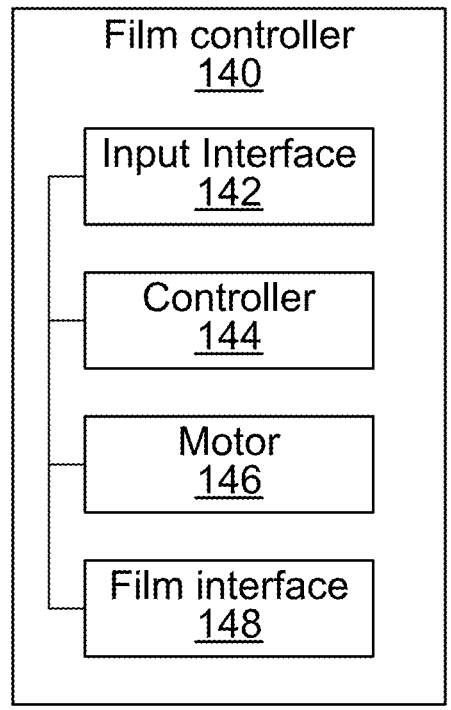
FIG. 1E is a block diagram showing possible elements of an embodiment of the motorized film controller of the proposed film digitizer.

FIG. 1E presents one embodiment of a film controller 140 that can preferably be motorized, which can comprise at least one of an input interface 142 (e.g., a user interface or control input interface), a controller 144, film interface 148 and/or a motor 146 for driving the film interface 148.

The film interface 148 of the film controller 140 can be used to guide (e.g., across the film digitizer) and feed the film to the rest of the module of the film digitizer (e.g., an exposure region, between the light source and the image recorder, for presenting a frame of a film). Various methods known in the art can be used to do so. In some embodiments, the film interface can comprise an ensemble of various components such as guiding wheels 156, an engaging/driving component 154 (e.g., wheel or gear) that can be coupled (e.g., using rubberlike material or the perforations if the film) and driven by the motor 146, holders 152 for supporting the film rolls/spools (e.g., turntables that can be driven and coupled to the motor) or a combination thereof. In some preferred embodiments, to possibly reduce the potential of damage, the film tension may be controlled (e.g., by the digital controller) using feedback from the motors themselves or using a monitoring sensor (e.g., a tachometer to monitor the displacement of the film). The film controller 140 can be used to move the film with precision (e.g., frame by frame) without damaging it.

Figure 1F:
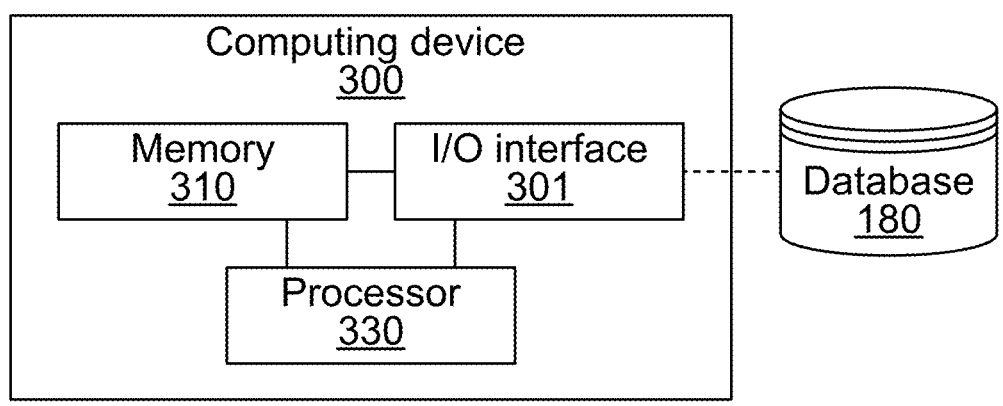
FIG. 1F is a block diagram showing possible elements of an embodiment of the computing device of the assembly of FIG. 1B.

FIG. 1F presents one embodiment of the computing device 300, which can comprise at least one of memory 310, a processor 330, and/or I/O interface 301.

The memory 310 of the computing device 300 can be any suitable type of memory known in the art (random-access memory (RAM), read-only memory (ROM), solid-state drive (SSD), hard disk drive (HDD), etc.) and can be used to save the data acquired/measured by the film digitizer 100, to store operation codes and programs to properly operate the computing device 300 and/or any other type of information.

The I/O interface 301 (user interface, USB, cable, internet, ethernet, Wi-Fi, Bluetooth, etc.) of the computing device 300 can be used to connect with the film digitizer and/or the database.

The computing device and/or the film digitizer can be connected to a database 180, which can be used to store, compile, retrieve from and/or transfer data (e.g., raw data, hypercube, recreated images/videos) from the computing device and/or the film digitizer.

Figure 2A:
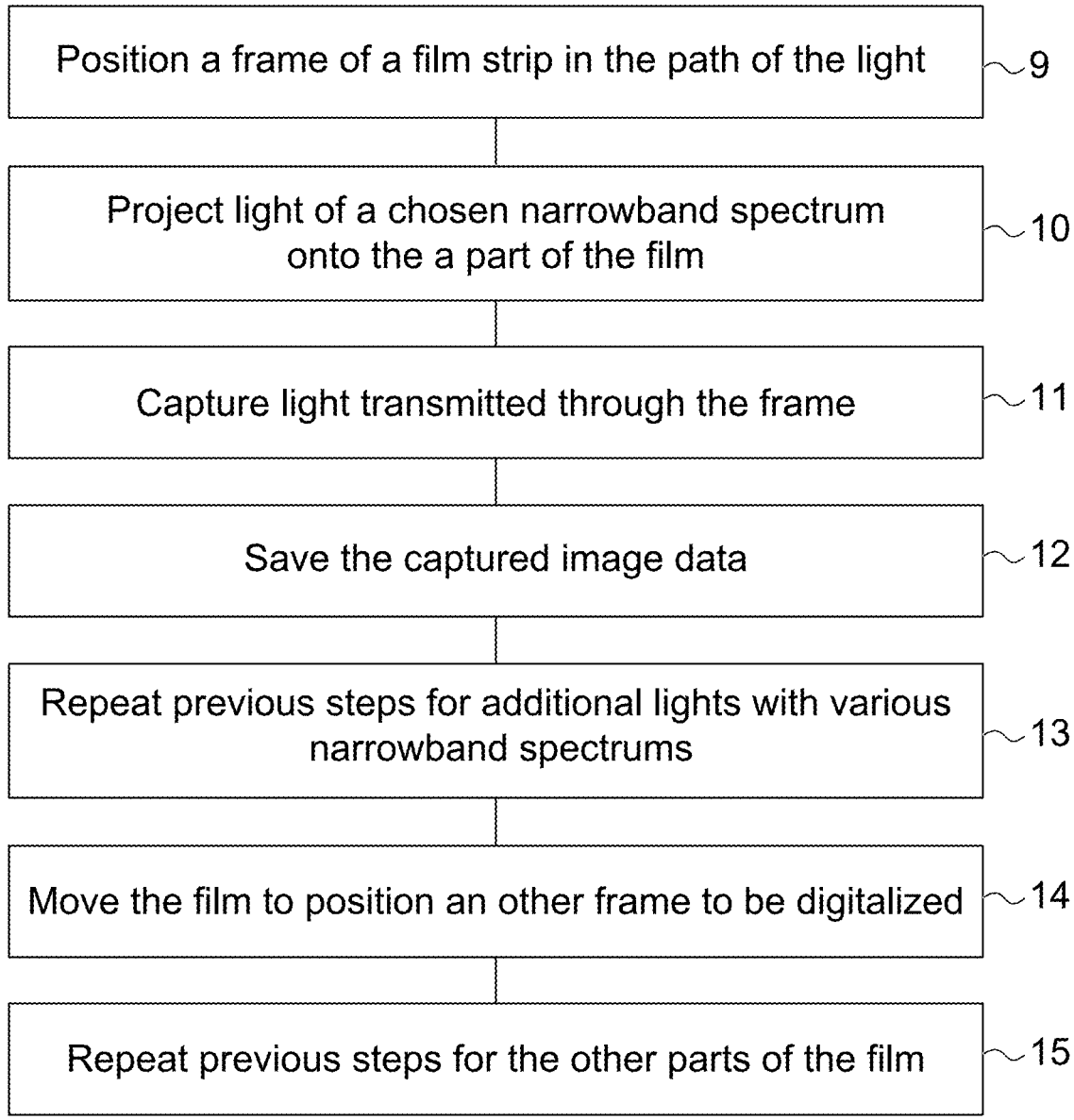
FIG. 2A is a block diagram showing possible steps that may be performed to complete the proposed method.

FIG. 2A shows a block diagram showing possible steps that may be performed to complete the multispectral film digitization with the proposed apparatus. An embodiment, the method can include some of the steps, which can include the step 9 of positioning (e.g., with the film controller 140) a frame of the film strip in the path of the light between the light source and the image recorder, a step 10 of projecting light of a chosen narrowband spectrum onto a selected portion of the film (e.g., a frame, the audio/soundtrack and the perforations of the film), a step 11 of capturing light transmitted through the frame with the image recorder, a step 12 of saving the captured image data, a step 13 repeating at least some of the other/previous steps using additional/various/different lights with various narrowband spectrums, a step 14 moving the film to position another frame to be digitalized, a step 15 repeating the previously performed steps for the other parts of the film.

Figure 2B:
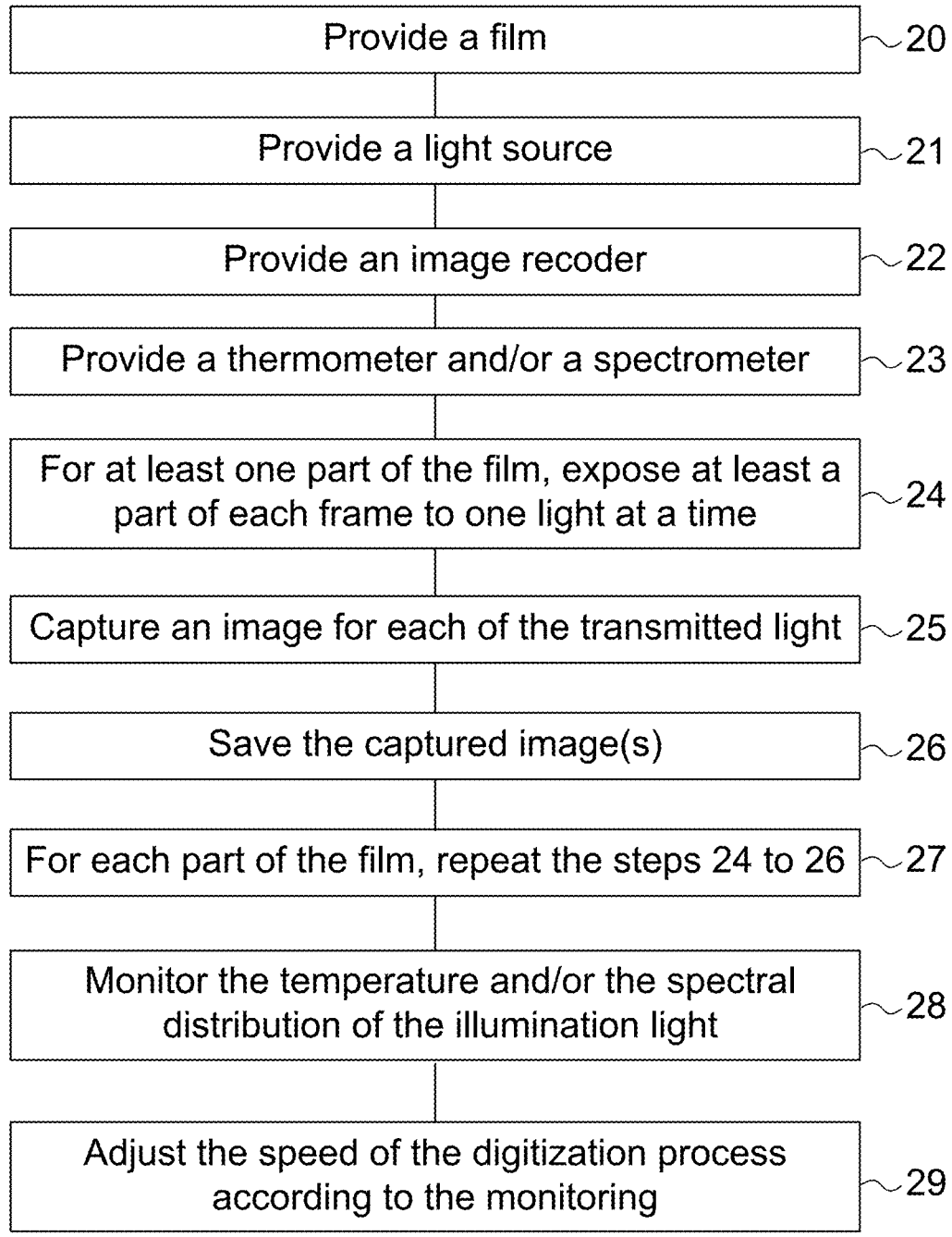
FIG. 2B is a block diagram showing other possible steps that may be performed to complete the proposed method.

FIG. 2B is a block diagram showing other possible steps that may be performed to complete some embodiments of the proposed method. The method can comprise some of: a step 20 of providing the film; a step 21 of providing a light source that can generate a plurality of illumination lights having distinctive narrowband light spectrum with all of the illumination lights covering at least a visible spectrum; a step 22 of providing an image recorder; a step 23 of providing a thermometer and/or a spectrometer; a step 24 of exposing, using the light source, a frame of the film to a sequence of the plurality of illumination lights; a step 25 of capturing, using the image recorder, an image for each one of the plurality of illumination lights; a step 26 of saving each of the captured images; a step 27 of repeating the previous steps for the other frames (some or all of the frames) of the film, a step 28 of monitoring and/or recording (storing as data) a temperature and/or the narrowband light spectrum of the illumination lights using the thermometer and/or the spectrometer; and a step 29 of adjusting a speed of the exposing (e.g., reducing the light intensity while increasing the exposure time and/or slowing the digitizing process: reducing the number of digitized frames per minute) and/or capturing according to the monitored temperature and/or the narrowband light spectrum of the illumination lights.

It will be appreciated by someone skilled in the art that some of the steps may be programmed in part or in totality in one or more of the components of the proposed apparatus and associated assembly. The associated code(s) or program(s) can be stored in a memory to be executed by a processor.

Figure 3:
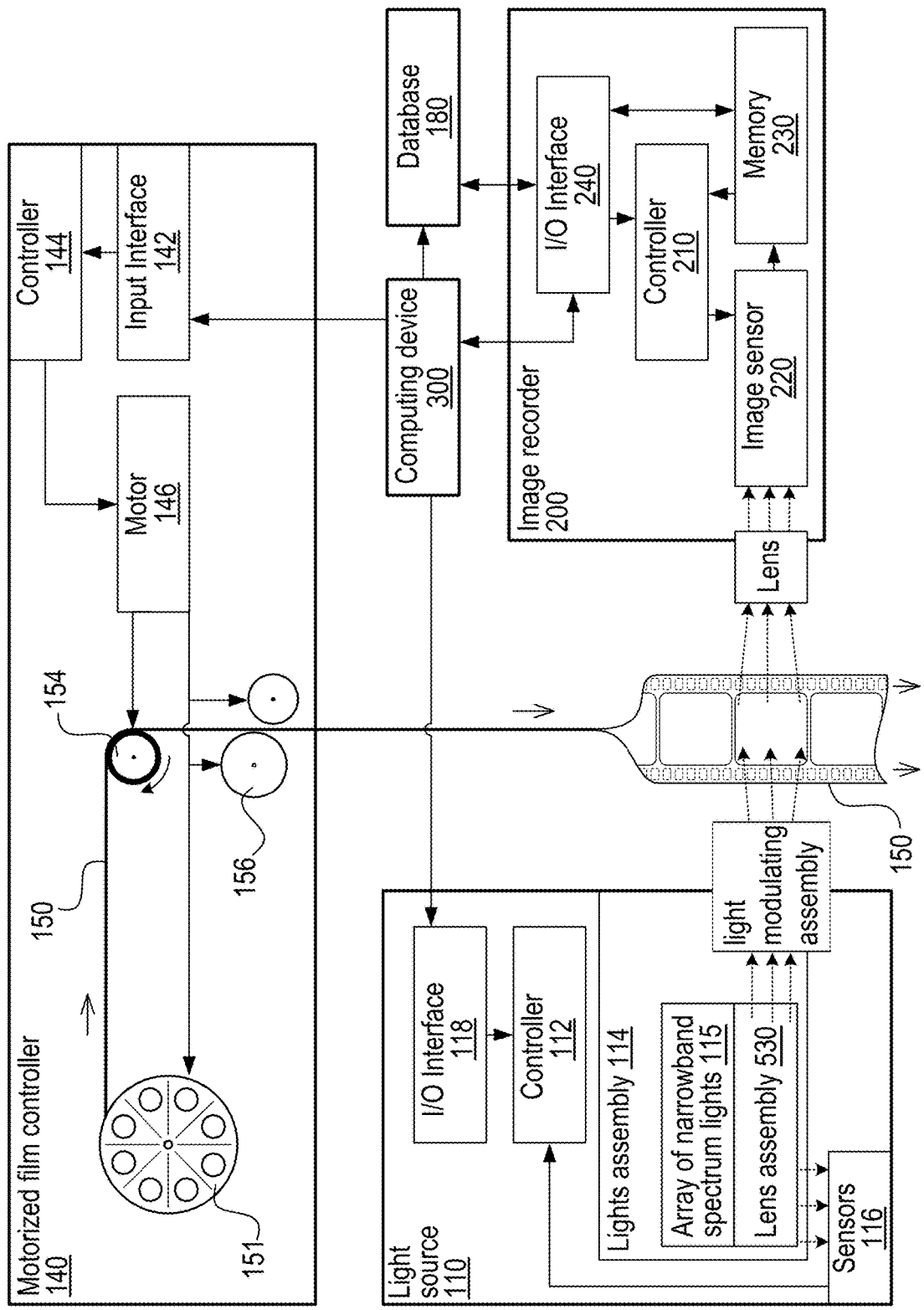
FIG. 3 shows a schematic representation of some of components and elements of the assembly of an embodiment of a system for digitizing a film.

FIG. 3 shows a schematic representation of some components and elements (e.g., the film rolls/spools 151) of the assembly of an embodiment of a system for digitizing a film. Note that some of the components illustrated can be optional and/or can be replaced by an alternative or any analogous components. For example, the light modulating assembly 119 of the light source 110 can comprise light filters/diffusers of the light source or can be optionally all together. The light source 110 can include a lens assembly 530 comprising at least one optical component for directing the generated light beam, from the light emission devices, to provide a uniform or near uniform illumination of the exposure region. FIG. 3 also illustrates a possible arrangement or direction of information/data, commands or mechanical force that can be exchanged by the various components of one embodiment of the proposed film digitizer. FIG. 3 also shows that the image recorder 200 can comprise a light modulating component 221 comprising at least one optical component for directing the light transmitted through the film 150 to the image sensor 220 of the image recorder 200.

Figure 4A:
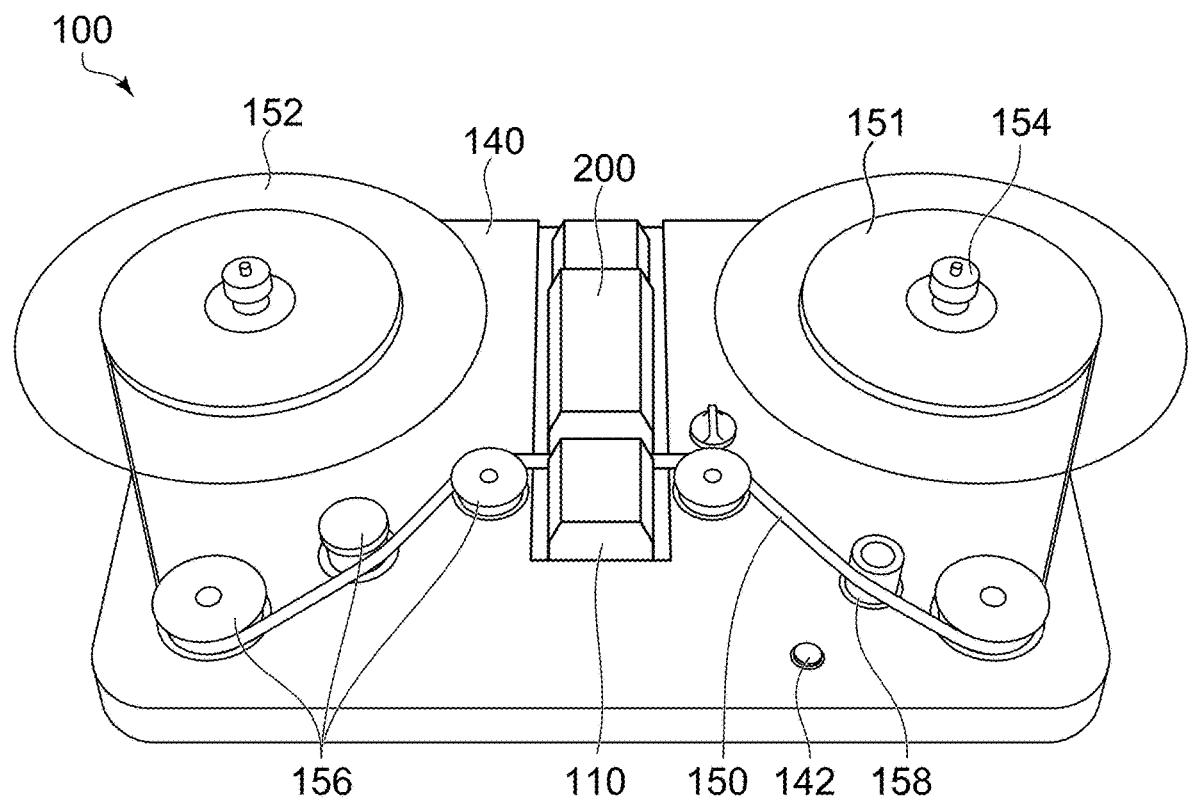
FIG. 4A shows a possible embodiment of the film digitizer comprising a light source, a film, an image recorder and a motorized film controller.

FIG. 4A shows a possible embodiment of the film digitizer 100 comprising a light source 110, a film 150, an image recorder 200 and a motorized film controller 140. The film controller 140 can comprise an assembly of holders 152 for supporting the film rolls/spools 151, guiding rollers 156, input interface 142, a driving component 154 that can be driven by the motor and/or a monitoring component 158 (e.g., a tachometer for counting frames or measuring distance).

It will be appreciated that the various guiding wheels (rollers) 156 may be further used for other purposes such as: applying a sufficient tension to the film (film tension), e.g., to ensure the that the film is stretched/flattened properly for digitizing, which may be critical for "damaged"/film; monitoring the film tension, e.g., to prevent damaging/ripping the film; monitoring the speed and/or the progress (the distance that film is moved) of the film, which can be used for providing feedback to other components (e.g., the motor 146).

Note that feedback may be necessary to properly provide the right control (e.g., speed, torque, force) to the rollers, especially for certain embodiments of the proposed apparatus where the transfer of the mass of the film rolls 151 (e.g., from one film holder 152 to the other) may result in a variation (e.g., a non-linear variation) control parameters (e.g., speed, torque, force) of a motor. This can result in various electromechanics issues, namely a variable relationship between the control parameters and the speed and/or position of the film in the apparatus.

For example, at the beginning of the digitizing process with an embodiment with two motors each driving a film holder, the first film holder may support and move/spin a film roll comprising most of the film—therefore significant weight—and the second film holder may support little to no film or film roll—therefore little weight—. In this case, the motor for driving the first film holder may need more torque/power to drive/move the large film roll and the motor for driving the second film holder for driving/moving the small film roll. This may change non-linearly throughout the digitizing process or for various types of films.

Figure 4B:
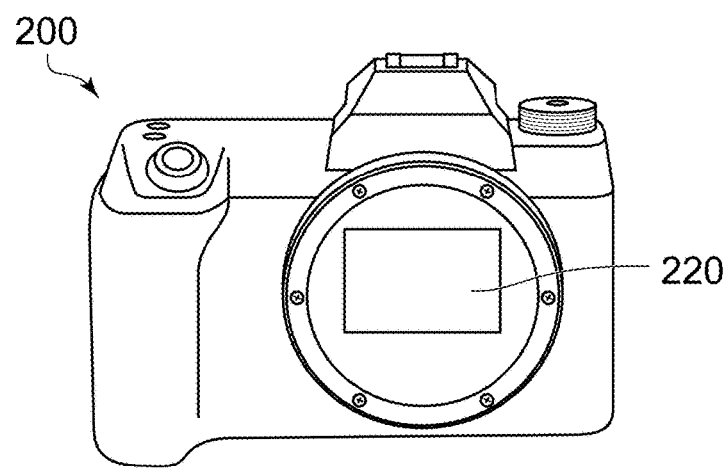
FIG. 4B shows a digital camera with its color filter removed that can be used as a possible embodiment of the image recorder of the proposed film digitizer. The image recorder can be a 102 megapixel, 16-bit RAW monochrome camera. The image recorder can be used to capture 10 images.

FIG. 4B shows a digital camera with its color filter removed that can be used as a possible embodiment of the image recorder 200 of the proposed film digitizer. The image recorder can be, but is not limited to, a digital monochrome camera. The image recorder can be, but is not limited to, a 102 megapixel, 16-bit RAW monochrome camera. The image recorder can be used to capture 10 images.

The image sensor 220 of the image recorder can be, but is not limited to, the photosensor of any digital camera having a suitable resolution and sensitivity. The higher the resolution of the photosensor the better the resolution of the acquired digital images.

It will be appreciated that additional components can be added and/or various methods may be used to improve/increase the effective resolution of the image sensor 220 and the captured images. For example, various pixel shift methods may be implemented to capture several images at various "shifted" positions by either moving ("shifting") the photosensor to a new position, moving the lenses of the image sensor or by controlling a liquid crystal lens in order to shift the position of light/image directed at the photosensor.

Figure 5A:
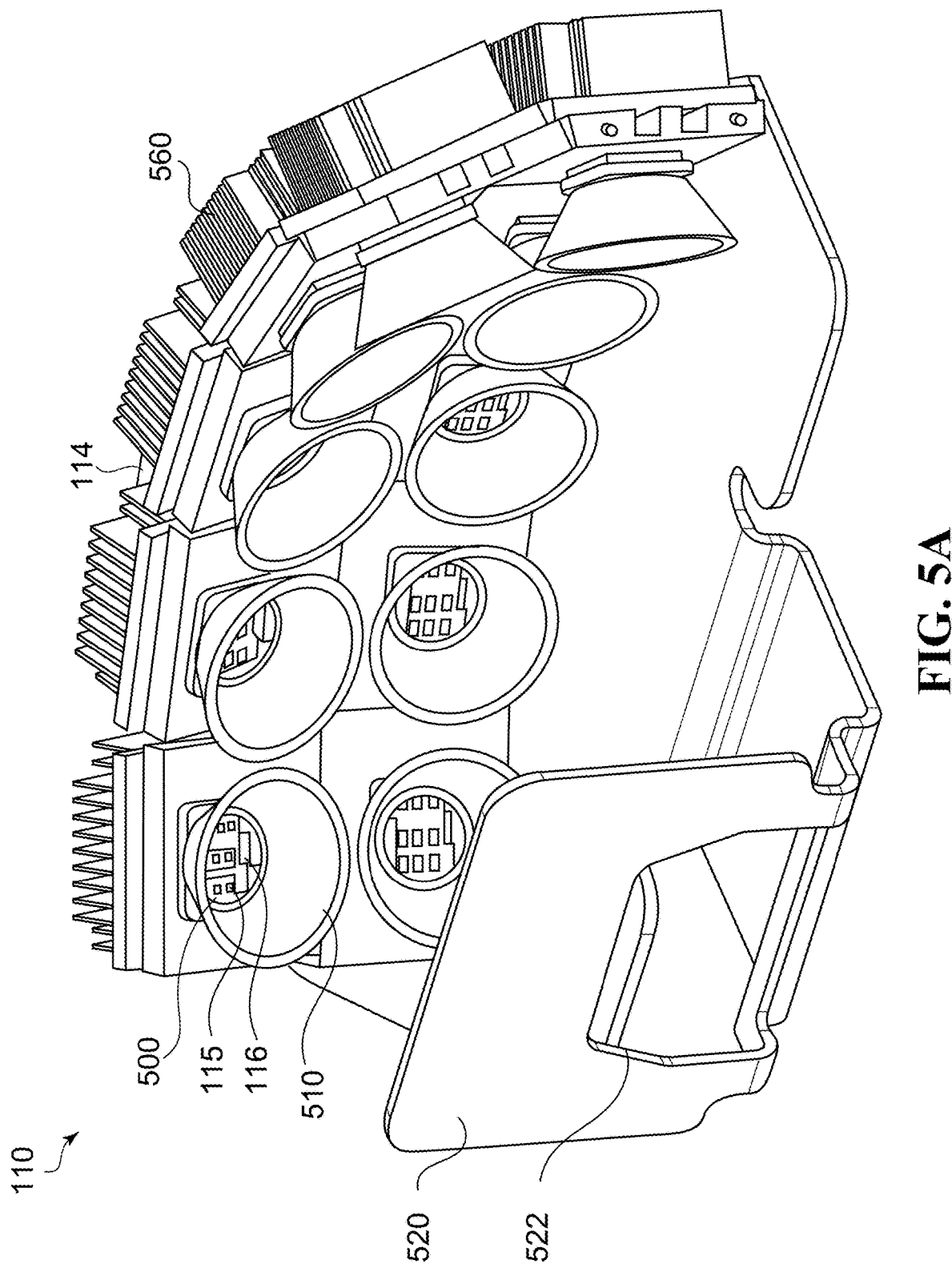
FIG. 5A is the schematic representation of an exemplary light source of the proposed film digitizer, comprising an array of clusters of narrowband spectrum lights each comprising a diffuser to help direct the beam of light at the film window of the film holder.

Now referring to FIG. 5A that shows the schematic representation of an exemplary light source 110 of the proposed film digitizer, comprising an array of light clusters (light assembly 114) arranged to direct the beams of light at the film window 522 of the film holder 520 (e.g., used to flatten the portion of the film to be digitized).

Figure 5B:
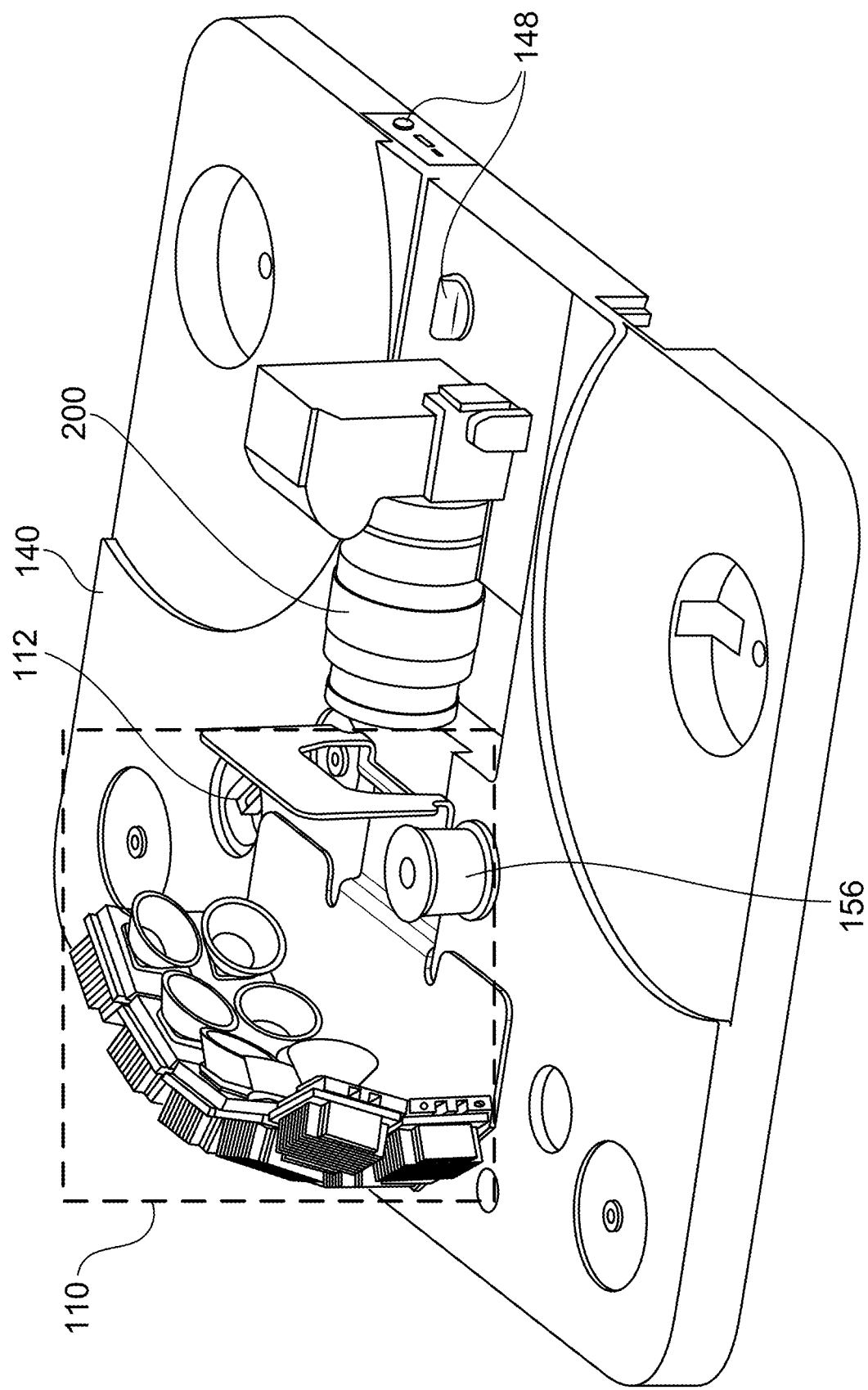
FIG. 5B shows a perspective view of a schematic representation of a possible embodiment of the proposed film digitizer comprising the light source of FIG. 5A.

FIG. 5B shows a perspective view of a schematic representation of a possible embodiment of the proposed film digitizer comprising the light source of FIG. 5A.

Figure 5C:
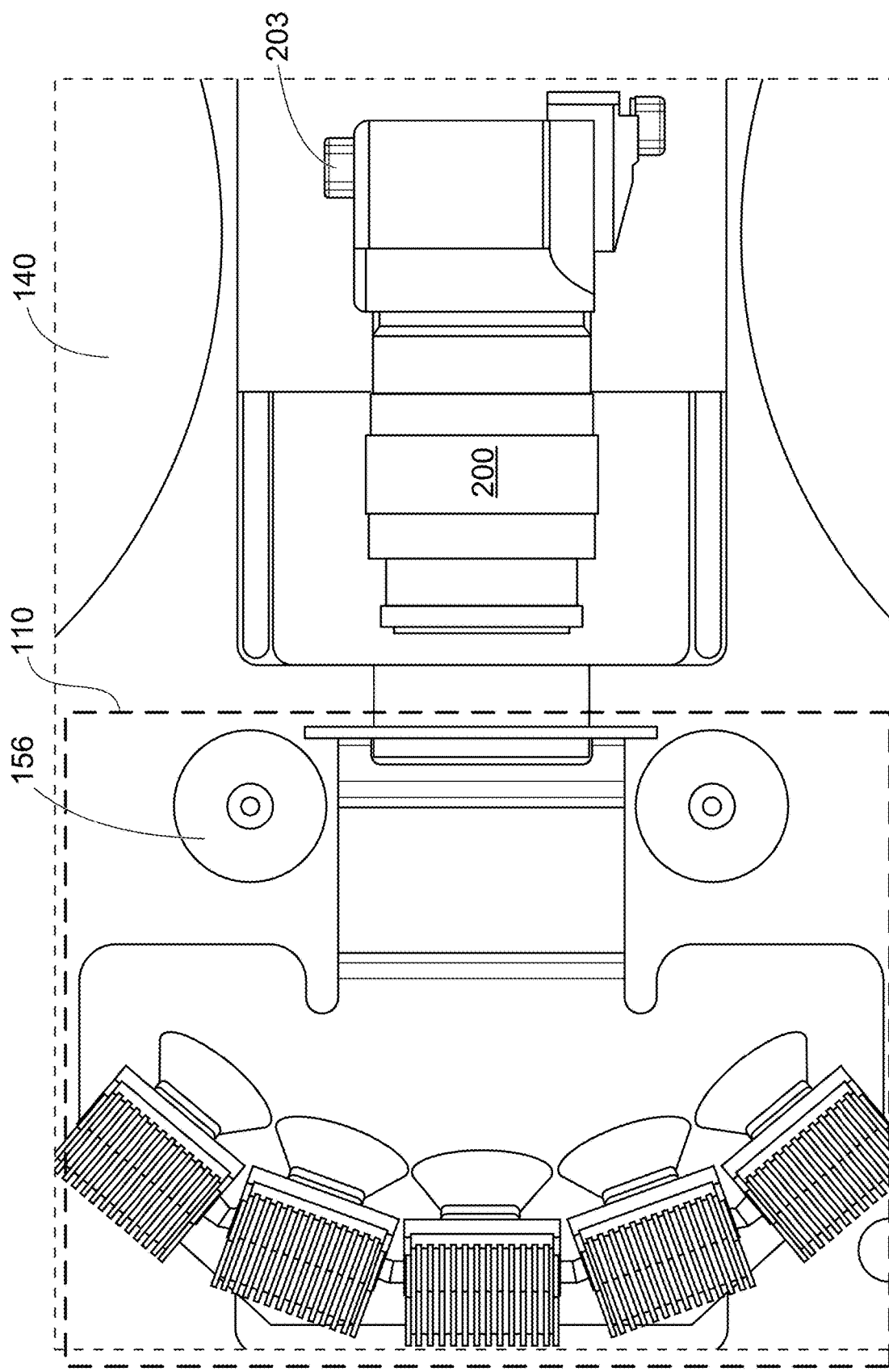
FIG. 5C is a top view of the schematic representation of FIG. 5B.

FIG. 5C is a top view of the schematic representation of FIG. 5B.

In some embodiments, each light emission devices, here clusters/constellations 500 of narrowband spectrum lights 115 (e.g., LEDs), of the array of lights 114 can each be coupled to one or more diffuser(s) 510 to help direct/focus the beams of light at the film window.

In some embodiments, the sensors 116 can be positioned so as to properly measure the various parameters of the light emission devices. For example, a sensor 116 such as a temperature sensor can be positioned near (e.g., coupled to) each one of the light emission devices (e.g., one thermometer for each cluster 500 narrowband spectrum light emission devices 115) to ensure accurate temperature measurements.

In some embodiments, the film window 522 of the film holder or target 520 can serve as an output of the light source or its housing to let the light output the exit and be projected onto the film. The film window 522 can be used as or part of an exposure region for presenting a frame of a film.

The output of the light source can comprise or be coupled to an output diffuser and/or an assembly of lens(es) to further modulate the light output.

In an embodiment, the array of lights can be a 3D array organized/positioned in a spherical or partly spherical arrangement (e.g., see FIG. 5A). The spherical arrangement can ensure that each light can be orientated to direct its light beam at about the output of the light source (e.g., at the exposure region and/or at the film window 522 to provide uniform illumination).

The output of the light source can be used to back illuminate the film.

In an embodiment, the color sets can comprise enough light emitting devices 115 (e.g., individual LEDs) of a same/similar narrowband spectrum to produce/provide sufficient light intensity to respect the desired exposure time for capturing one digital image. The higher the number of lights, the greater the light intensity but also greater the heat output.

It will be appreciated by someone skilled in the art that the required sufficient light intensity can easily be determined according to the specifications of the image recorder used to capture the images, the required exposure time for capturing a single digital image and the light intensity of each of the individual lights chosen to generate a given narrowband spectral distribution.

In some embodiments, the array of lights 114 can comprise 10 color sets, which can each have an array, collection and/or cluster 500 of about 25 narrowband light emitting devices 115 (e.g., LEDs) that can be cooled and temperature controlled to ensure that they do not drift in their output central wavelength.

The exposure time can take more than several seconds, down to less than 0.1 milliseconds.

In some embodiment, the maximal exposure time (time to capture a single image) can be of about a few milliseconds (e.g., about 10 ms) and the total acquisition time to capture various (e.g., between eight to fourteen or ten) consecutive images (e.g., at various wavelengths) can be no more than about 0.1 seconds.

It will be appreciated that the exposure time can also vary depending on the density of the film, the intensity of the light, the setting of the focal length (f-stop) of the lens and other variables.

In some embodiments, the light source comprises or be thermally coupled to at least one heatsink to reduce/prevent uncontrolled heating. To prevent the light source from getting too hot (e.g., over a maximal/critical temperature threshold), the lights 115 (e.g., clusters of lights 500) can be equipped with individual heatsinks 560.

Figure 14A:
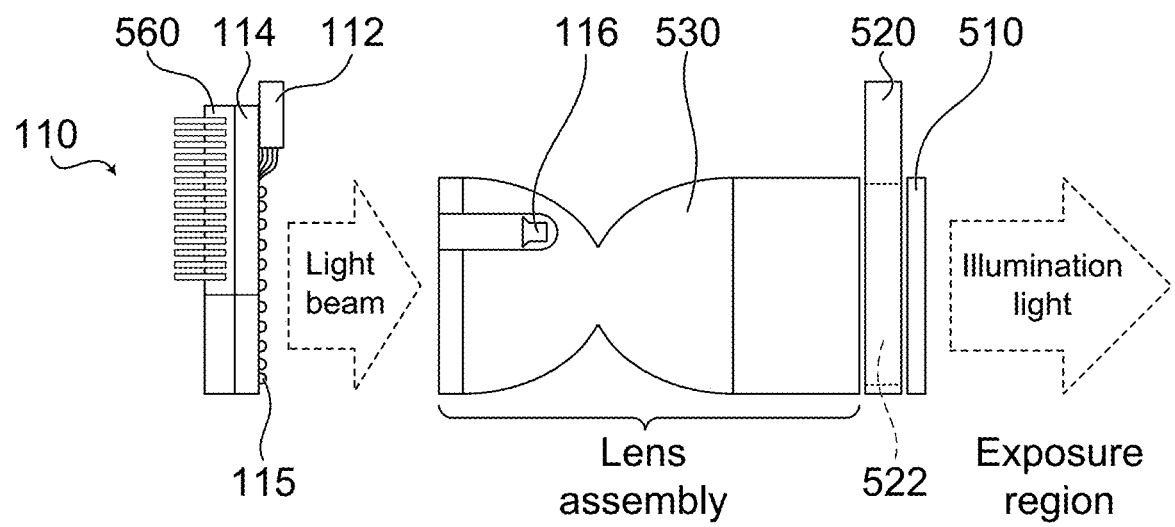
FIG. 14A presents a schematic side view of some components of a preferred embodiment of the light source.

Now referring to FIG. 14A that presents a schematic side view of a preferred embodiment of the assembly of the light source 110. In some embodiments, the light source 110 can comprise a light assembly 114 that includes a pair of concentric circular arrays of light emitting devices 115 (e.g., LEDs) thermally coupled to a heat sink 560 and to a light controller 112. In some of the preferred embodiments, the light source 110 can further comprise sensors 116 (e.g., a spectrometer arranged to receive part of the light beam emitted by the light assembly 114), a lens assembly 530 for modulating/guiding the light beam of the light assembly 114, a film holder 520 that may have a film window 522, and a light diffuser 510 to provide a more uniform distribution of the illumination light to the film.

Figure 14B:
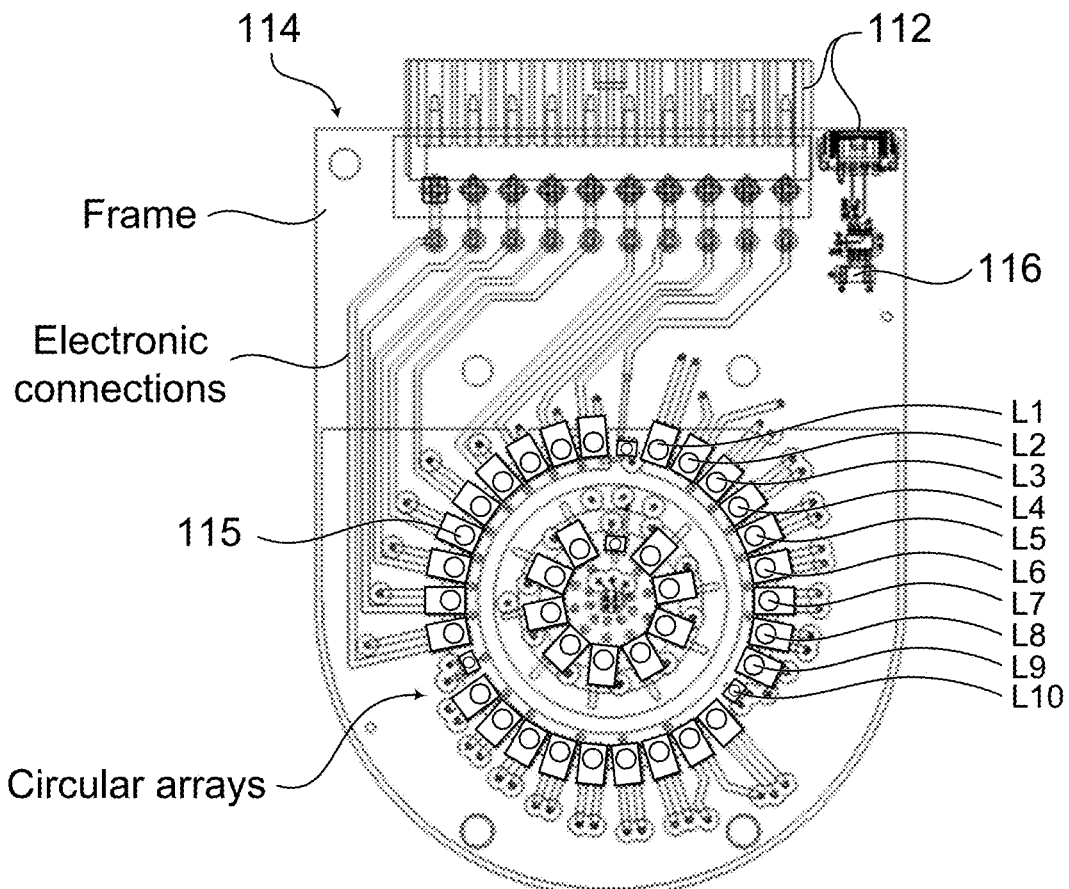
FIG. 14B presents a front view of a preferred embodiment of the light assembly of the light source.

FIG. 14B illustrates a front view of a technical drawing of a preferred embodiment of the light assembly 114. In some of the preferred embodiments, ten color sets (L1-L10) of four narrowband spectrum light emission devices 115 can be arranged in a pair of concentric circular arrays, coupled to a frame of the light assembly 114 and connected to the light controls 112 via electronic connections. The light assembly can comprise sensors 116, such as a thermometer, for example.

In some embodiments, some narrowband spectrum light emission devices 115 of a same/similar color (of a same color set) can be arranged to be radially symmetric (e.g., at every 360/N degree to have N number of lights 115 of a same spectrum). For example, in some embodiments, an outer circular array comprises three lights 115 of a same/similar spectrum of each one the color sets (L1-L10) placed at every 120 degree and an inner ring comprises a single light 115 of each one of the color sets (L1-L10). Similarly, the narrowband spectrum light emission devices 115 can be positioned and ordered, based on their color, on after the other.

A grid array may be used, but a circular array may be a preferred embodiment since it can yield some advantages, such as providing a symmetric and more uniform light beam for the various color sets (L1-L10). A circular array can be optimized so that the emitted light beam can be collected by a circular lens assembly 530 positioned in front of the lights 115.

In some embodiments, the information/data recorded and stored by the proposed film digitizer can include 2D (e.g., raw images), 3D images (e.g., a hypercube) and/or metadata.

In some embodiments, the metadata can include information that relates to the physical characteristics of the film, which can include, for example, measurements of linear and/or non-linear shrinkage, physical film damage such as cuts, rips, physical splices in the film and/or dirt/dust, physical notches, markings that exist on the film, or a combination thereof. In an embodiment, the metadata can include information relating to the characteristics of the image recorder such as, for example, the exposure of the various image acquisitions, the camera model, the type of lens(es), the characteristics of the aperture, and any other information from the image recorder. The metadata can also include information about the operator, date, time, etc. In an embodiment, the metadata can include information related to the light source such as the information measured by its sensors (e.g., type of illuminant, spectral curve of illuminants, temperature of illuminants). In some cases, the determined/analyzed physical characteristics may be sent to a database as an inspection report that may be generated by the film digitizer or a computing device.

It will be appreciated by someone skilled in the art that the physical characteristics (e.g., dimensions) of the film or specifically of a non-image portion of the film (e.g., a frame, the audio/soundtrack and/or the perforations of the film) can be determined using image analysis (e.g., programmed or deep learning). In some cases, the image analysis can identify that the perforations for guiding the film have some differences with their initial shape/dimensions which provide a measure of linear and/or non-linear film shrinkage/deformation in the two dimensions. The identification of physical splices and other materials that can be used to join the film may be determined by AI or any other technology and device known in the related art, such as image processing, for example. This is important for scanning very old film and can be used to correct the digital images for such film shrinkage/deformation.

While the purpose of the preservation/digitization of the film can be used to reproduce a faithful RGB output (e.g., for standard displays), it will be appreciated that the recorded color information could be used to generate unconventional images that can comprise an alternative combination of colors, which can be displayed on unconventional displays. For example, a nonconventional display can provide—and a nonconventional image can comprise—nonconventional/non-RGB color (e.g., purple pixels).

It will be appreciated that the color information can be used to adapt the displayed/generated image according to the visual sensitivity on a user-to-user basis (e.g., adapted for a viewer with colorblind deficiency).

What is claimed is:

1. A film digitizer comprising:
 a controllable film feed mechanism having an exposure region for presenting a frame of a film;
 a light source for producing an illumination light comprising an array of narrowband spectrum lights each thermally coupled to a heat sink and orientated to direct a light beam of said lights to at least one optical component for directing light at an output of said light source to provide uniform illumination of said exposure region, and each one of said lights being part of one of a plurality of color sets covering at least a visible spectrum, wherein each one of said plurality of color sets provides a distinct narrowband of light;

an image recorder for recording digital images of said frame of said film in the exposure region by measuring with a monochromatic image sensor a light transmission of said illumination light of the light source through said film;

a controller operatively connected to said controllable film feed mechanism, said image recorder and said lights, said controller is operative to sequentially activate said array of narrowband spectrum lights to sequentially generate sufficient intensity of said illumination light to cause said image recorder to record one of said digital images for each distinct narrowband of light of each of said plurality of color sets; and at least one of:

a temperature sensor in thermal contact with said array of narrowband spectrum lights for measuring a temperature of said array of narrowband spectrum lights during said recording of said digital images; wherein one of: said controller records said temperature as metadata of said recorded digital images: and said controller stabilizes said distinct narrowband of light of each of said plurality of color sets of said illumination light by adjustably controlling said controllable film feed mechanism, said image recorder and said array of narrowband spectrum lights when said temperature of said array of narrowband spectrum lights corresponds to an undesired change in their narrowband emission; and a spectrometer arranged to measure a spectral distribution of said illumination light during said recording of said digital images, wherein one of: said controller records said spectral distribution as metadata of said recorded digital images; and said controller stabilizes said distinct narrowband of light of each of said plurality of color sets of said illumination light by adjustably controlling said controllable film feed mechanism, said image recorder and said array of narrowband spectrum lights when said spectral distribution of said illumination light deviates from a tolerated spectral distribution.

2. The film digitizer of claim 1, wherein said film digitizer comprises said spectrometer arranged to measure said spectral distribution of said illumination light.

3. The film digitizer of claim 1, wherein said film digitizer comprises said temperature sensor and said spectrometer.

4. The film digitizer of claim 1, wherein said plurality of color sets comprises between eight to twenty said lights, each of said plurality of color sets having a different narrowband spectral distribution comprised between 350 nm and 800 nm.

5. The film digitizer of claim 1, wherein said recoded digital images are stored in memory as a hypercube comprising a plurality of said recorded digital images.

6. The film digitizer of claim 1, further comprising a computing device for identifying at least one two-dimensional deformation characteristic of the film and for correcting any two-dimensional deformation of said captured images using said at least one two-dimensional deformation characteristic.

7. The film digitizer of claim 6, wherein said computing device identifies said at least one two-dimensional deformation characteristic from a non-image portion of said film.

8. The film digitizer of claim 1, wherein said plurality of narrowband spectrum light emission devices comprises enough of said emission devices to provide said illumination light with a sufficient light intensity to have an exposure time of less than 10 milliseconds per image acquisition.

9. The film digitizer of claim 1, wherein said light source further comprises a liquid cooling system to exchange heat.

10. The film digitizer of claim 1, wherein said film digitizer comprises said temperature sensor in thermal contact with said array of narrowband spectrum lights for measuring said temperature of said array of narrowband spectrum lights; wherein one of: said controller records said temperature as metadata of said recorded digital images; and said controller stabilizes said illumination light by adjustably controlling said controllable film feed mechanism, said image recorder and said array of narrowband spectrum lights when said temperature of said array of narrowband spectrum lights corresponds to said undesired change in said narrowband emission.

11. The film digitizer of claim 1, wherein said array of narrowband spectrum lights comprises a plurality of concentric circular arrays centered on a central axis of said at least one optical component comprising at least a light diffuser, wherein said lights being part of each one of said plurality of color sets are radially symmetrically arranged in each one of said plurality of concentric circular arrays.

12. A method of multispectral digitization of film comprising:

providing said film;

providing a light source that can generate a plurality of illumination lights each having a distinct narrowband light spectrum, with all of said illumination lights covering at least a visible spectrum;

providing a monochrome image recorder;

providing at least one of: a temperature sensor; and a spectrometer;

exposing in turn, using said light source, at least a plurality of frames of said film to a sequence of said plurality of illumination lights;

capturing, using said monochrome image recorder and during said exposing, an image of said film for each of one of said sequence of said plurality of illumination lights;

saving each of said captured images;

at least one of:

measuring, during said exposing, a temperature of each of said plurality of illumination lights using said temperature sensor; and measuring, during said exposing, said narrowband light spectrum of each of said plurality of illumination lights using said spectrometer; and executing at least one of:

adjusting said exposing or said capturing according to said measured temperature of said illumination lights to stabilize said distinct narrowband light spectrum of each of said illumination lights;

adjusting said exposing or said capturing according to said measured narrowband light spectrum of said illumination lights to stabilize said distinct narrowband light spectrum of each of said illumination lights; and saving said measured temperature or said measured narrowband light spectrum as metadata of the corresponding one of said captured images, thereby allowing for better generation of digital polychromatic image of at least one of said plurality of frames of said film by considering said undesired change in said narrowband light spectrum.

13. The method of claim 12, wherein said temperature sensor is provided and used to measure said a temperature of each of said plurality of illumination lights during said exposing, and wherein said executing comprises adjusting said exposing or said capturing according to said measured temperature of said illumination lights to stabilize said distinct narrowband light spectrum of each of said illumination lights.

14. The method of claim 12, wherein said spectrometer is provided and used to measure said narrowband light spectrum of each of said plurality of illumination lights during said exposing, and wherein said executing comprises adjusting said exposing or said capturing according to said measured narrowband light spectrum of said illumination lights to stabilize said distinct narrowband light spectrum of each of said illumination lights.

15. The method of claim 12, wherein said executing comprises saving said measured temperature or said measured narrowband light spectrum as metadata of the corresponding one of said captured images.

16. The method of claim 12, wherein, for each of said plurality of frames, said saved captured images are stored as a hypercube.

17. The method of claim 12, further comprising determining a wavelength of said illumination lights of said captured image using a corresponding one of said saved measured temperature and a temperature-to-wavelength standard of a corresponding light emission device that produced said illumination light.

18. The method of claim 12, further comprising: determining at least one two-dimensional deformation characteristic of at least one of said captured images; correcting for any two-dimensional film deformation of said at least one of said captured images using a corresponding said at least one two-dimensional deformation characteristic.

19. The method of claim 18, wherein said captured images comprises a non-image portion of said film, and wherein said at least one two-dimensional deformation characteristic is determined from said non-image portion of said film.

20. The method of claim 19, wherein said non-image portion of said film comprises a part of a soundtrack or perforations of said film.

* * * * *